US00RE33964E

United States Patent [19]

Ishikawa et al.

[11] E Patent Number: Re. 33,964

[45] Reissued Date of Patent: Jun. 16, 1992

[54] METHOD OF PROCESSING SILVER HALIDE COLOR PHOTOGRAPHIC MATERIAL AND PHOTOGRAPHIC COLOR DEVELOPING COMPOSITION

[75] Inventors: Takatoshi Ishikawa; Hiroshi Fujimoto; Nobutaka Ohki; Morio Yagihara, all of Minami Ashigara, Japan

[73] Assignee: Fuji Photo Film Co., Ltd., Kanagawa, Japan

[21] Appl. No.: 581,630

[22] Filed: Sep. 11, 1990

Related U.S. Patent Documents

Reissue of:

[64] Patent No.: 4,798,783
Issued: Jan. 17, 1989
Appl. No.: 117,727
Filed: Nov. 6, 1987

[30] Foreign Application Priority Data

Nov. 7, 1986 [JP] Japan ..... 61-265149
Feb. 4, 1987 [JP] Japan ..... 62-24374

[51] Int. Cl.[5] ..... G03C 7/30; G03C 5/24

[52] U.S. Cl. ..... 430/372; 430/377; 430/380; 430/446; 430/467; 430/468; 430/483; 430/489; 430/490

[58] Field of Search ..... 430/372, 377, 380, 434, 430/440, 464, 467, 483, 490, 468, 489, 446

[56] References Cited

FOREIGN PATENT DOCUMENTS 0158446 9/1985 Japan .
1448575 9/1976 United Kingdom .

*Primary Examiner*—Richard L. Schilling
*Attorney, Agent, or Firm*—Sughrue, Mion, Zinn, Macpeak & Seas

[57] ABSTRACT

A method of processing a silver halide color photographic material in which the color developer used comprises an aromatic primary amine color developing agent and a compound of formula:

(I)

wherein

X represents a trivalent group necessary to complete a condensed ring;

$R^1$ and $R^2$ each represents an alkylene group, an arylene group, an alkenylene group, or an aralkylene group;

and, if desired, does not contain a substantial amount of benzyl alcohol to achieve improved stability and color developability of the color developer and a reduction of fog generation in the running development process.

20 Claims, No Drawings

METHOD OF PROCESSING SILVER HALIDE COLOR PHOTOGRAPHIC MATERIAL AND PHOTOGRAPHIC COLOR DEVELOPING COMPOSITION

Matter enclosed in heavy brackets [ ] appears in the original patent but forms no part of this reissue specification; matter printed in italics indicates the additions made by reissue.

FIELD OF THE INVENTION

The present invention relates to a method of processing a silver halide color photographic material and, more particularly, to a processing method which ensures improvements in the stability and developability of a color developer and marked reduction in the increase of fog in a running color development process.

BACKGROUND OF THE INVENTION

Color developers containing color developing agents of the aromatic primary amine type have been used from of old for formation of color images and at present having a primary role in the color photographic image-forming process. However, the color developers described above are exceedingly prone to air oxidation and oxidation due to the presence of. It is well-known that when color images are formed using oxidized developing solutions, an increase in fog density and changes in photographic speed and gradation are caused, which interfere with achieving the intended photographic characteristics.

Therefore, various means for enhancing preservability of color developers have so far been investigated. The most general means among them is the combined use of hydroxylamine and sulfite ion. However, this method has the drawback that the hydroxylamine produces ammonia by decomposition which causes fog and the sulfite ion competes against the developing agent to impair developability. Accordingly, it is hard to say that both of them are preferred as a compound capable of enhancing the preservabililty of a color developer (or a preservative).

In particular, sulfite ion, though it has been used from of old as an agent capable of increasing the preservability of various color developing agents or preventing the decomposition of hydroxylamines, drastically impairs developability and lowers color density of the developed image to a considerable extent, especially when it is used in a system free of benzyl alcohol. Benzyl alcohol is harmful from the standpoint of environmental pollution and preparation of developers.

Alkanolamines described in Japanese Patent Application (OPI) No. 3532/79 (the term "OPI" as used herein means an "unexamined published application") and polyethylene imines described in Japanese Patent Application (OPI) No. 94349/81 have been proposed as a substitute for sulfites. However, these compounds cannot produce sufficient effects.

In addition, various kinds of preservatives and chelating agents have been examined for the purpose of improving the stability of color developers.

As examples of preservatives, aromatic polyhydroxy compounds described in Japanese Patent Application (OPI) Nos. 49828/77, 160142/84 and 47038/81, U.S. Pat. No. 3,746,544, and so on, hydroxycarbonyl compounds described in U.S. Pat. No. 3,615,503 and British Pat. No. 1,306,176, α-aminocarbonyl compounds described in Japanese Patent Application (OPI) Nos. 143020/77 and 89425/78, metal salts described in Japanese Patent Application (OPI) Nos. 44148/82 and 53749/82, hydroxamic acids described in Japanese Patent Application (OPI) Nos. 27638/77, and so on, may be mentioned.

As examples of chelating agents, on the other hand, mention may be made of aminopolycarboxylic acids described in Japanese Patent Publication Nos. 30496/73 and 30232/69, organic phosphonic acids described in Japanese Patent Application (OPI) No. 97347/81, Japanese Patent Publication No. 39359/81 and West German Pat. No. 2,227,639, phosphonocarboxylic acids described in Japanese Patent Application (OPI) Nos. 102726/77, 42730/78, 121127/79, 126241/80 and 65956/80, and so on, and other compounds described in Japanese Patent Application (OPI) Nos. 195845/83 and 203440/83, Japanese Patent Publication No. 40900/78, and so on.

However, sufficient preservability cannot be obtained with any of the preservatives and chelating agents described above and, what is worse, some of them exert undesirable effects upon photographic characteristics.

For the foregoing reasons, satisfactory results have not yet been achieved and the advent of excellent preservatives, especially those capable of taking the place of sulfites, have been desired.

Further, it is described in Japanese Patent Application (OPI) Nos. 95345/83 and 232342/84 that a color photographic material comprising a silver chlorobromide emulsion with a high chloride content tends to generate fog at the time of color development. When an emulsion of the above-described kind is used, a preservative which has low solubility in the emulsion and more excellent preservability is essential to a color developer. Any preservative which will suffice for the above-described needs also has not been found until now.

SUMMARY OF THE INVENTION

Therefore, one object of the present invention is to provide a method of processing a silver halide color photographic material in which the color developer used is excellent in stability and the increase in fog density in the running color development process is reduced to a considerable extent.

Another object of the present invention is to provide a method of processing a silver halide color photographic material in which excellent developability can be acquired, not withstanding the fact that the color developer is substantially free of benzyl alchol.

The above-described objects of the present invention have been attained with a method of processing a silver halide color photographic material in which the development processing is performed using a developer containing an aromatic primary amine color developing agent and at least one compound represented by the formula:

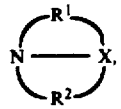

(I)

wherein X is a trivalent group necessary to complete a condensed ring; and $R^1$ and $R^2$ may be the same as or different from each other and $R^1$ and $R^2$ each represents an alkylene group, an arylene group, an alkenylene group, or an aralkylene group.

DETAILED DESCRIPTION OF THE INVENTION

In formula (I), groups preferred as X are trivalent groups containing not more than 20 carbon atoms, preferably not more than 10 carbon atoms, and more preferably not more than 6 carbon atoms. X may further containing other atoms like nitrogen, oxygen, sulfur or so on.

X preferably represents a trivalent group containing not more than 6 carbon atoms, which may further contain a nitrogen atom or an oxygen atom.

Each of the groups represented by $R^1$ and $R^2$ in formula (I) may be substituted by other groups, for example, by a hydroxy group, an alkoxy group, etc. The number of carbon atoms contained in $R^1$ and $R^2$, respectively, is preferably 10 or less, more preferably 6 or less, and particularly preferably 3 or less. $R^1$ and $R^2$ each preferably represents an alkylene group or an arylene group, and particularly preferably represents an alkylene group.

The compound of formula (I) may be a bis or tris body formed by connecting to each other through X.

Specific examples of groups represented by X in formula (I) include

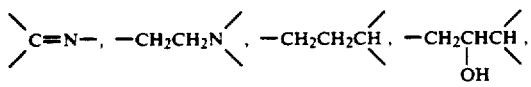

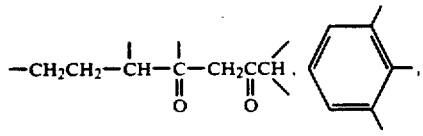

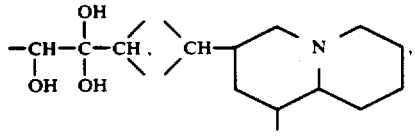

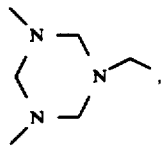

so on.

Specific examples of groups represented by $R^1$ abnd $R^2$ in formula (I) include a methylene group, an ethylene group, a propylene group, a butylene group, a pentylene group, a 1,2-cyclohexylene group, a 1-methylethylene group, a 1,2-dimethylethylene group, a 1-carbocxyethylene group, a 1,2-phenylene group, a 1,2-vinylene group, a 1,3-propenylene group, and so on. These groups each may further be substituted with an alkyl group, a halogen atom, a carboxyl group, a sulfo group, a hydroxyl group, an alkoxy group, an alkylthio group, an amino group, an amido group, an acyl group, a carbamoyl group, a sulfamoyl group, a heterocyclyl group, and so on.

Of the compounds represented by formula (I), particularly preferred ones are represented by formulae (I-a) and (I-b).

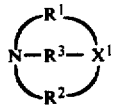

(I-a)

In the above formula, $X^1$ represents

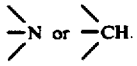

$R^1$ and $R^2$ may be the same or different and each have the same meanings, respectively, as $R^1$ and $R^2$ in formula (I). $R^3$ represents one of the groups represented by $R^1$ and $R^2$, or

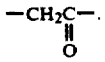

In formula (I-a), a preferred $X^1$ is

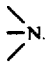

The number of carbon atoms contained in the groups represented by each of $R^1$, $R^2$ and $R^3$, respectively, is preferably 6 or less, more preferably 3 or less, and particularly preferably 2. Groups preferred as $R^1$, $R^2$ and $R^3$ respectively are an alkylene group and an arylene group, and the most preferred one is an alkylene group.

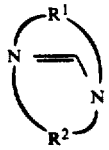

(I-b)

In the above formula, $R^1$ and $R^2$ may be the same or different and each have the same meanings, respectively, as $R^1$ and $R^2$ in formula (I).

The number of carbon atoms in groups represented by $R^1$ and $R^2$, respectively, is preferably 8 or less, more preferably 6 or less in the formula (I-b). Among groups represented by $R^1$ and $R^2$, favored ones are an alkylene group and an arylene group, and the most favored one is an alkylene group.

The compounds represented by formula (I-a) are preferable to those represented by formula (I-b).

Specific examples of the compounds of the present invention, which are represented by the foregoing formula (I), are illustrated below. However, the invention should not be constured as being limited to the following compounds.

I-(1)
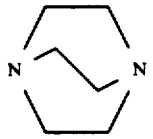
(DABCO)
I-(2)
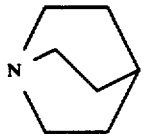
I-(3)
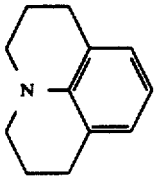
I-(4)
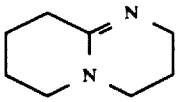
(DBN)
I-(5)
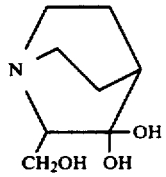
I-(6)
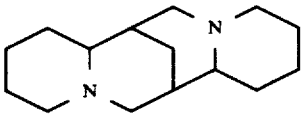
I-(7)
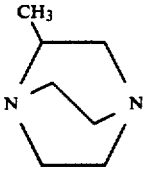
I-(8)
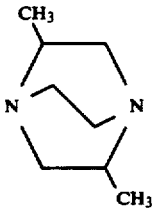
I-(9)
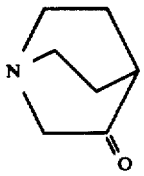
-continued
I-(10)
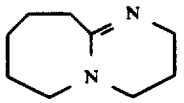
(DBU)
I-(11)
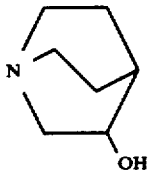
I-(12)
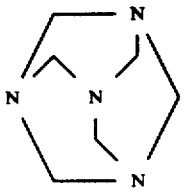
I-(13)
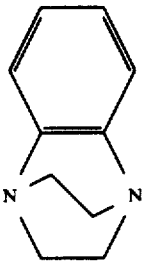
I-(14)
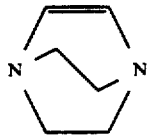
I-(15)
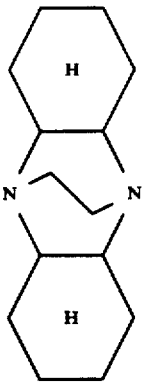
I-(16)
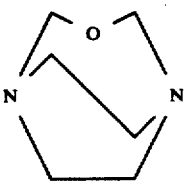

-continued

I-(17)

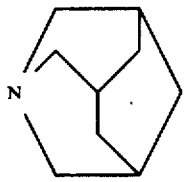

I-(18)

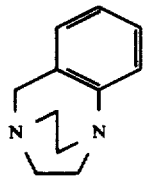

Many of the compounds represented by formula (I) in the present invention are easily available as commercial products.

Each of the compounds represented by formula (I) is added in an amount of preferably 0.1 to 50 g, particularly 0.2 to 20 g, per liter of color developer.

A color developer which can be used in the present invention is described below.

The color developer to be used in the present invention contains a known color developing agent of the aromatic primary amine type.

Aromatic primary amines preferred as a color developing agent are p-phenylene diamine derivatives, and typical examples of the derivatives are cited below. However, the invention should not be contrued as being limited to the following examples.

D-1 N,N-diethyl-p-phenylenediamine.

D-2 4-[N-ethyle-N-(β-hydroxyethyl)amino]aniline.

D-3 2-methyl-4-[N-(β-hydroxyethyl)amino]aniline

D-4 4-amino-3-methyl-[N-ethyl-N-(β-methanesulfonamidoethyl)]-aniline

These p-phenylenediamine derivatives may used in their salt form, such as sulfate, hydrochloride, sulfite, p-toluene-sulfonate, etc, salts. A color developing agent of the aromatic primary amine type is used in a quantity of preferably about 0.1 g to about 20 g, more preferably about 0.5 g to about 10 g, per liter of developing solution.

It is particularly preferred to use the color developing agent of D-4 in the presence of the compound of formula (I) in respect that increase in fog is checked and more desirable photographic characteristics are obtained.

In addition, the compounds of the present invention can fully achieve their preservability when used in combination with a compound capable of directly stabilizing a color developing agent in the system using an aromatic primary amine as the color developing agent. In general, water-soluble antioxidants are known as the compounds capable of directly stabilizing developing agents, with specific examples including hydroxylamines and other compounds described hereinafter.

As the compound which can be used together with the compounds of the present invention in the color developer, hydroxylamines are preferred. In particular, those represented by the formula $$R^{21}-\underset{\underset{OH}{|}}{N}-R^{22} \qquad \text{(II)}$$

are favored over others,

In formula (II), $R^{21}$, and $R^{22}$ each represents a hydrogen atom, or an unsubstituted or substituted alkyl, alkenyl or aryl group.

Of groups represented by $R^{21}$ and $R^{22}$, an alkyl group and an alkenyl group are preferred. When at least one of $R^{21}$ and $R^{22}$ is a substituted alkyl or alkenyl group, the compound can produce a more desirable effect. Also, $R^{21}$ and $R^{22}$ may combine with each other to form a nitrogen atom-containing hereto ring.

Alkyl and alkenyl groups may assume any form, such as a straight chain, a branched chain or a cyclic group, and they may be substituted by a halogen atom, an aryl group (e.g., phenyl, p-chlorophenyl, etc.), an alkoxy group (e.g., methoxy, ethoxy, methoxyethoxy, etc.), an aryloxy group (e.g., phenoxy, etc.), a sulfonyl group (e.g., methanesulfonyl, p-toluenesulfonyl, etc.), a sulfonamido group (e.g., methanesulfonamido, benzenesulfonamido, etc.), a sulfamoyl group (e.g., diethylsulfamoyl, unsubstituted sulfamoyl, etc.), a carbamoyl group (e.g., unsubstituted carbamoyl, diethylcarbamoyl, etc.), an amido group (e.g., acetamido, benzamido, etc.), a ureido group (e.g., methylureido, phenylureido, etc.), an alkoxycarbonylamino group (e.g., methoxycarbonyl amino, etc.), an aryloxycarbonylamino group (e.g., phenoxycarbonylamino, etc.), a cyano group, a hydroxy group, a carboxy group, a sulfo group, a nitro group, an amino group (e.g., unsubstituted amino, diethylamino, etc.), an alkylthio group (e.g., methylthio, etc.), an arylthio group (e.g., phenylthio, etc.), or a heterocyclyl group (e.g., morpholyl, pyridyl, etc.), or so on The groups represented by $R^{21}$ and $R^{22}$ may be the same or different and the substituent groups thereof may be the same or different.

The number of carbon atoms contained in the groups represented by $R^{21}$ and $R^{22}$ is preferably 1 to 10, particularly preferably 1 to 5. Suitable examples of nitrogen-containing heterocyclyl groups formed by combining $R^{21}$ and $R^{22}$ include a piperidyl group, a pyrrolidyl group, an N-alkylpiperazyl group, a morpholyl group, an indolinyl group, a benzotriazolyl group, and so on.

Preferred substituent groups of $R^{21}$ and $R^{22}$ include a hydroxy group, an alkoxy group, a sulfonyl group, an amido group, a carboxy group, a cyano group, a sulfo group, a nitro group, and an amino group.

Specific examples of the compound represented by formula (II) which can be used in the present invention are illustrated below. However, the invention should not be construed as being limited to the following compounds.

II-1

$$C_2H_5-\underset{\underset{OH}{|}}{N}-C_2H_4OCH_3$$

II-2

$$CH_3-\underset{\underset{OH}{|}}{N}-C_2H_4OC_2H_5$$

II-3

$$CH_3OC_2H_4-\underset{\underset{OH}{|}}{N}-C_2H_4OCH_3$$

-continued

II-4 $C_2H_5OC_2H_4-\overset{\overset{OH}{|}}{N}-C_2H_4OC_2H_5$

II-5 $C_2H_5OC_2H_4-\overset{\overset{OH}{|}}{N}-C_2H_5$

II-6 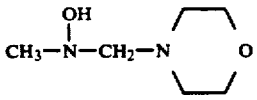

II-7 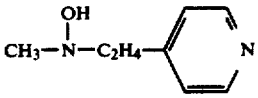

II-8 $C_2H_5SO_2C_2H_4-\overset{\overset{OH}{|}}{N}-C_2H_4SO_2C_2H_5$

II-9 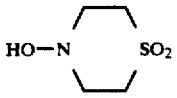

II-10 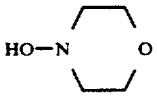

II-11 $HOOC-CH_2-\overset{\overset{OH}{|}}{N}-CH_2-COOH$

II-12 $HOCH_2CH_2\overset{\overset{OH}{|}}{N}CH_2CH_2OH$

II-13 $CH_3CH_2\overset{\overset{OH}{|}}{N}CH_2CH_3$

II-14 $NH_2OH$

Other specific examples of the compound represented by formula (II) and methods for synthesizing the compounds of formula (II) are shown in U.S. Pat. Nos. 3,661,996, 3,362,961 and 3,293,034, Japanese Patent Publication No. 2794/67, and U.S. Pat. Nos. 3,491,151, 3,655,764, 3,467,711, 3,455,916, 3,287,125 and 3,287,124.

Those compounds may form salts together with various kinds of acids, such as hydrochloric acid, sulfuric acid, nitric acid, phosphoric acid, oxalic acid, acetic acid and so on.

As examples of "compounds capable of directly stabilizing color developing agents", other than hydroxylamines, which are preferably used in combination with the compounds of the present invention, mention may be made of hydrazines, hydrazides, phenols, sugars, hydroxamic acids, α-aminoketones, α-hydroxyketones, and so on.

Details of these compounds are illustrated below.

The hydroxamic acids are preferably represented by the formula $$A^{31}-X^{31}-\underset{\underset{R^{31}}{|}}{N}-O-Y^{31} \qquad \text{(III)}$$

In formula (III), $A^{31}$ represents a hydrogen atom, an alkyl group, an aryl group, an amino group, a heterocyclic group, an alkoxy group, an aryloxy group, a carbamoyl group, a sulfamoyl group, an acyl group, a carboxy group, a hydroxyamino group, or a hydroxyaminocarbonyl group. These groups each may have a substituent group, such as a halogen atom, an aryl group, an alkyl group, an alkoxy group, an aryloxy group, a hydroxy group, a sulfonyl group, a sulfonamido group, a sulfamoyl group, a sulfo group, an amido group, an ureido group, a cyano group, a hydroxyaminocarbonyl group, a carboxy group, a nitro group, an amino group, an alkoxycarbonyl group, an aryloxycarbonyl group, an alkylthio group, an arylthio group, a heterocyclic group (e.g., pyridyl, morpholino, etc.), or so on Preferred examples of groups represented by $A^{31}$ include substituted or unsubstituted alkyl, aryl, amino, alkoxy and aryloxy groups. Particularly favorable ones are substituted or unsubstituted amino, alkoxy and aryloxy groups. The number of carbon atoms contained in such groups may range from 1 to 10.

$X^{31}$ represents $$-\underset{\underset{O}{\|}}{C}-,\quad -\underset{\underset{S}{\|}}{C}-,$$

$-SO_2-$, or $-SO-$. A preferred group represented by $X^{31}$ is $$-\underset{\underset{O}{\|}}{C}-.$$

$R^{31}$ represents a hydrogen atom, an alkyl group, or an aryl group. Further, $R^{31}$ may combine with $A^{31}$ to form a cyclic structure. These groups each may have a substituent group. Suitable examples of such substituent groups include the same as those cited with regard to $A^{31}$. A hydrogen atom is particularly preferred as $R^{31}$.

$Y^{31}$ represents a hydrogen atom, or a group capable of being converted to a hydrogen atom by hydrolysis.

As specific examples of such groups to be converted to a hydrogen atom by hydrolysis, mention may be made of the following.

(1) Those protected by an ester linkage or an urethane linkage, wherein $Y^{31}$ represents $$-\underset{\underset{O}{\|}}{C}-R^{22}.$$

Suitable examples of groups represented by $R^{32}$ include alkyl, aryl and amino groups.

(2) Those protected by an imidomethyl blocking group described in U.S. Pat. No. 4,363,865, wherein $Y^{31}$ represents

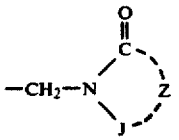

In the blocking group, J represents

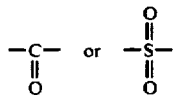

and Z represents plural atoms necessary to complete a hetero ring having at least one 5- to 6-membered ring.

Specific examples of hydroxamic acids are illustrated below. However, the invention should not be construed as being limited to the following examples.

(III)-1

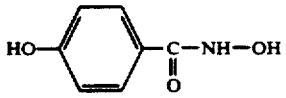

(III)-2

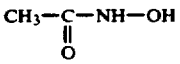

(III)-3

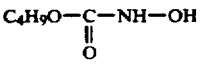

(III)-4

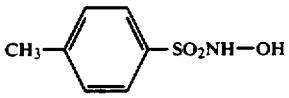

(III)-5

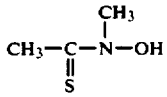

(III)-4

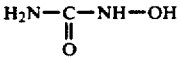

Other specific examples of hydroxamic acids include those described in Japanese Patent Application No. 18559/86 incorporated herein by reference, and such acids are available on a basis of the description therein.

The hydrazines and hydrazides are preferably represented by the formula (IV)

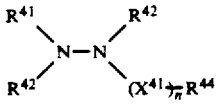

In formula (IV), $R^{41}$, $R^{42}$ and $R^{43}$ each represents a hydrogen atom, an alkyl group (containing 1 to 20 carbon atoms, with examples including a methyl group, an ethyl group, a sulfopropyl group, a carboxybutyl group, a hydroxyethyl group, and the like), an aryl group (containing 6 to 20 carbon atoms, with examples including a phenyl group, a 2,5-dimethoxyphenyl group, a 4-hydroxyphenyl group, a 2-carboxyphenyl group and the like), or heterocyclic group (containing 1 to 20 carbon atoms, with examples including a pyridine-4-yl group and so on).

$R^{44}$ represents a hydroxy group, a hydroxyamino group, an alkyl group (containing 1 to 20 carbon atoms, with examples including a methyl group, an ethyl group, a sulfopropyl group, a carboxybutyl group, a hydroxyethyl group, a cyclohexyl group, a benzyl group and so on), an aryl group (containing 6 to 20 carbon atoms, with examples including a phenyl group, a 2,5-dimethoxyphenyl group, a 4-hydroxyphenyl group, a 2-carboxyphenyl group and so on), a heterocyclic group (containing 1 to 20 carbon atoms, with examples including a pyridin-4-yl group and so on), an alkyoxy group (containing 1 to 20 carbon atoms, with examples including a methoxy group, an ethoxy group, a methoxyethoxy group, a benzyloxy group, a cyclohexyloxy group and so on), an aryloxy group (containing 6 to 20 carbon atoms, with examples including a phenoxy group, a p-methoxyphenoxy group and so on), a carbamoyl group (containing 1 to 20 carbon atoms, with examples including an unsubstituted carbamoyl group, an N,N-diethylcarbamoyl group, a hydrazinocarbonyl group and so on), or an amino group (containing 0 to 20 carbon atoms, with examples including an unsubstituted amino group, an N-phenylamino group, a hydrazino and so on).

$X^{41}$ represents a divalent group selected from the group consisting of —CO—, —$SO_2$— and

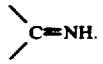

n represents 0 or 1. When n is 0, $R^{44}$ represents an alkyl group, an aryl group or a heterocyclic group alone, or it may combine with $R^{43}$ to form a hetero ring. These groups $R^{43}$ and $R^{44}$ each may be substituted In formula (IV), $R^{41}$, $R^{42}$ and $R^{43}$ preferably are each selected from a hydrogen atom or an alkyl group. In particular, $R^{41}$ and $R^{42}$ are each most preferably a hydrogen atom.

In formula (IV), $R^{44}$ is preferably an alkyl group, an aryl group, an alkoxy group, a carbamoyl group or an amino group.

$X^{41}$ is preferably —CO— or —$SO_2$—, and —CO— is particularly favored.

Specific examples of compounds of formula (IV) which may be used in the present invention are set forth below. However, the present invention should not be construed as being limited to the following examples.

(IV-1)

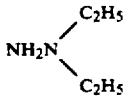

(IV-2)

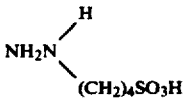

(IV-3)

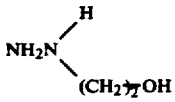

(IV-4)

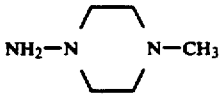

(IV-5)

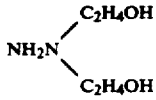

$NH_2NHCOCH_3$ (IV-6)

$NH_2NHCOOC_2H_5$ (IV-7)

-continued (IV-8)

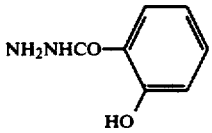

(IV-9)

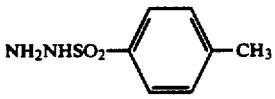

$NH_2NHCONH_2$ (IV-10)

(IV-11)

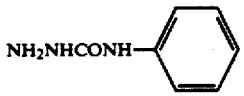

$NH_2NHSO_3H$ (IV-12)

(IV-13)

$$NH_2NH\overset{\overset{\displaystyle NH}{\|}}{C}NH_2$$

$NH_2NHCOCONHNH_2$ (IV-14)

Other typical examples of such compounds include those described in Japanese Patent Application No. 170756/86, incorporated herein by reference, and they are available on the basis of the description therein.

Preferred phenols are represented by the formula.

(V)

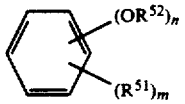

In the formula (V), $R^{51}$ represents a hydrogen atom, a halogen atom, an alkyl group (e.g., a methyl group, an ethyl group, a t-butyl group, etc.), an aryl group (e.g., a phenyl group, etc.), an alkoxy group (e.g., a methoxy group, an ethoxy group, etc.), an aryloxy group (e.g., a phenoxy group, etc.), a carboxyl group, a sulfo group, a carbamoyl group, a sulfamoyl group, an amido group (e.g., an acetamido group, a benzamido group, etc.), a sulfonamido group (e.g., a methanesulfonamido group, a benzenesulfonamido group, etc.), a ureido group, an alkylthio group (e.g., a methylthio group, etc.), an arylthio group (e.g., a phenylthio group, etc.), a nitro group, a cyano group, an amino group, a formyl group, an acyl group (e.g., an acetyl group, etc.), a sulfonyl group (e.g., a methanesulfonyl group, a benzenesulfonyl group, etc.), an alkoxycarbonyl group (e.g., a methoxycarbonyl group, etc.), an aryloxycarbonyl group (e.g., a phenoxycarbonyl group, etc.), an alkoxysulfonyl group, (e.g., a methoxysulfonyl group, etc.), or an aryloxysulfonyl group (e.g., a phenoxysulfonyl group, etc.).

When $R^{51}$ is further substituted, suitable examples of groups by which it may be substituted include one or more halogen atoms, alkyl groups, aryl groups, hydroxyl groups, alkoxy groups, aryloxy groups, carboxyl groups, sulfo groups, carbamoyl groups, sulfamoyl groups, amido groups, sulfonamido groups, ureido groups, alkylthio groups, arylthio groups, nitro groups, cyano groups, amino groups, formyl groups, acyl groups, sulfonyl groups, alkoxycarbonyl groups, aryloxycarbonyl groups, alkoxysulfonyl groups, aryloxysulfonyl groups, and heterocyclic groups (e.g., morpholyl, pyridyl, etc., groups).

When $R^{51}$ is substituted by two or more of the above-mentioned substituent groups, the two or more substituent groups may be the same or different.

When two or more $R^{51}$ are present, they may be the same or different.

When $—OR^{52}$ and $—R^{51}$ are adjacent to each other, they may combine with each other to form a ring. The ring formed may be a 5- or 6-membered, saturated or unsaturated ring, and may be comprised of atoms selected from carbon, hydrogen, halogen, oxygen, nitrogen, sulfur and other atoms.

In addition, when $R^{51}$ or its substituent group represents carboxyl or sulfo group, the group may assume the form of an alkali metal salt (e.g., Na, K or like salt), and amino groups also may form salts together with various acids, e.g., hydrochloric acid. $R^{52}$ represents a hydrogen atom or a hydrolyzable group. The term hydrolyzable group refers to a group capable of being replaced with a hydrogen atom by hydrolysis. As an example of such a group, mention may be made of $$-\overset{\overset{\displaystyle O}{\|}}{C}-R^{53}$$

(wherein $R^{53}$ represents an alkyl group, an aryl group, or an amino group). More specifically, $R^{52}$ is a means for protecting the phenolic —OH group and forms an ester of urethane linkage. As another example of the protecting means, mention may be made of imidomethyl blocking groups described in U.S. Pat. No. 4,363,865. That is, $R^{52}$ represents

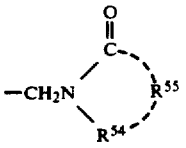

(wherein $R^{54}$ represents $$-\overset{\overset{\displaystyle O}{\|}}{C}- \text{ or } -\overset{\overset{\displaystyle O}{\|}}{\underset{\underset{\displaystyle O}{\|}}{S}}-,$$

and $R^{55}$ represents the atoms necessary to complete a hetero ring having at least 5- or 6-members).

m and n each represents an integer of 1 to 5.

In the foregoing formula (V), preferred groups as $R^{51}$ include an alkyl group, a halogen atom, an alkoxy group, an alkylthio group, a carboxyl group, a sulfo group, a carbamoyl group, a sulfamoyl group, an amino group, an amido group, a sulfonamido group, a nitro group, and a cyano group. Of these groups, the alkoxy, alkylthio, amino and nitro groups are particularly favored over the others.

Each $R^{51}$ group is preferably located in positions ortho or para to the $—OR^{52}$ group.

In addition, the number of carbon atoms contained in $R^{51}$ is preferably from 1 to 10, and particularly preferably from 1 to 6.

Preferred groups as $R^{52}$ include a hydrogen atom and hydrolyzable groups containing 1 to 5 carbon atoms. When not less than two ($—OR^{52}$) groups are present, they are preferably located in positions ortho or para to each other.

Specific examples of the phenols of formula (V) are illustrated below. However, the invention should not be construed as being limited to these compounds.

V-1

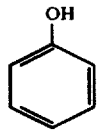

V-2

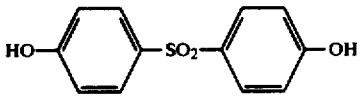

V-3

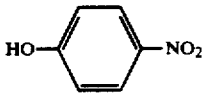

V-4

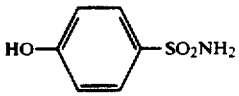

V-5

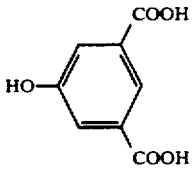

V-6

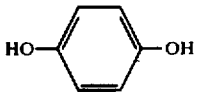

V-7

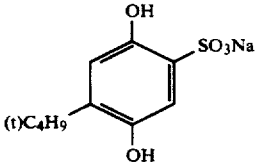

V-8

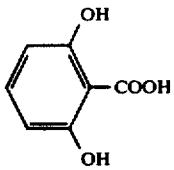

V-9

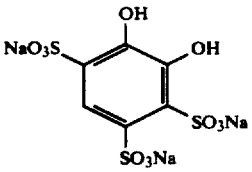

V-10

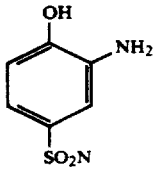

-continued

V-11

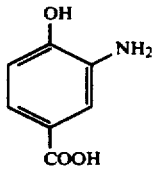

Other specific compounds are described in Japanese Patent Application Nos. 188742/86 and 203253/86, incorporated herein by reference and available on the basis of the descriptions therein.

α-hydroxyketones and α-aminoketones are preferably those represented by the formula:

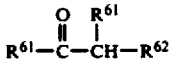

(VI)

In the above formula, $R^{61}$ represents a hydrogen atom, an alkyl group (containing 1 to 20 carbon atoms, e.g., a methyl group, an ethyl group, a hydroxymethyl group, a methoxyethyl group, a cyclohexyl group, etc.), an aryl group (containing 6 to 20 carbon atoms, e.g., a phenyl group, a 2-hydroxyphenyl group, etc.), an alkoxy group (containing 1 to 20 carbon atoms, e.g., a methoxy group, an ethoxy group, a methoxyethoxy group, etc.), an aryloxy group (containing 6 to 20 carbon atoms, e.g., a phenoxy group, a 4-methoxyphenoxy group, etc.), or an amino group (containing 0 to 20 carbon atoms, e.g., an unsubstituted amino group, an N,N-diethylamino group, an N-phenylamino group, etc.).

$R^{62}$ represents a hydrogen atom, an alkyl group (containing 1 to 20 carbon atoms, e.g., a methyl group, an ethyl group, a hydroxymethyl group, etc.), or an aryl group containing from 6 to 20 carbon atoms, e.g., a phenyl group, a 2-hydroxyphenyl group, etc.).

$R^{61}$ and $R^{62}$ may combine to form a carbon ring or a hetero ring.

$X^{61}$ represents a hydroxyl group or an amino group (containing 0 to 20 carbon atoms, e.g., an unsubstituted amino group, an N,N-diethylamino group, a morpholino group, etc.).

In the foregoing formula (VI), preferred groups as $R^{61}$ include a hydrogen atom, an alkyl group, an aryl group and an alkoxy group, while preferred groups as $R^{62}$ include a hydrogen atom and an alkyl group.

Specific examples of the α-hydroxyketones and α-aminoketones of formula (VI) are illustrated below. However, the present invention should not be construed as being limited to these compounds.

(VI-1)

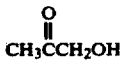

(VI-2)

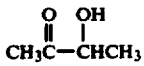

(VI-3)

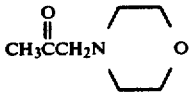

(VI-4)

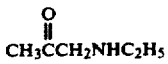

-continued (VI-5)

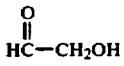

(VI-6)

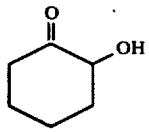

(VI-7)

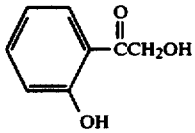

(VI-8)

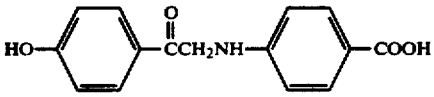

(VI-9)

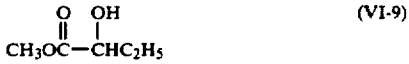

(VI-10)

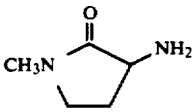

Other specific compounds are described in Japanese Patent Application No. 188741/86, incorporated herein by reference and available on the basis of the description therein.

"Saccharides" are described in detail below.

Saccharides (which may also be called carbohydrates) consist of monosaccharides and polysaccharides. Many have the formula $C_nH_{2n}O_m$. In general, aldehydes or ketones or polyhydric alcohols (which are called aldoses and ketoses), reduced derivatives thereof, oxidized derivatives thereof, dehydrated derivatives thereof, amino sugars, thio sugars are collectively called monosaccharides. The term polysaccharides refers to the products obtained by condensing two or more of the above-described monosaccharide through dehydration.

Of these saccharides, aldoses having a reductive aldehyde group and derivatives thereof are preferred over the others. In particular, the corresponding monosaccharides of such aldoses are favored.

Specific examples of saccharides which can be used are illustrated below. However, the invention should not be construed as being limited to these compounds. (Optical isomers of the exemplified saccharides can also be used.)

D-Xylose VII-1

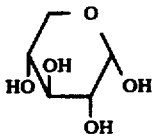

L-arabinose VII-2

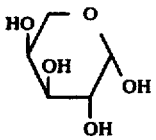

-continued

D-ribose VII-3

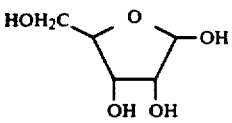

D-deoxyribose VII-4

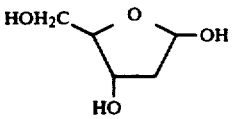

D-glucose VII-5

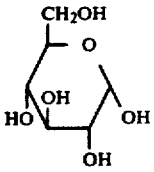

D-galactose VII-6

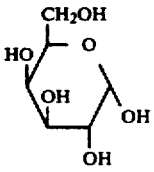

D-mannose VII-7

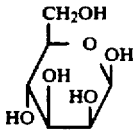

Glucosamine VII-8

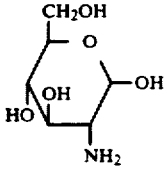

L-sorbose VII-9

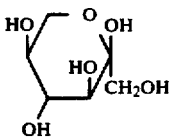

D-sorbite (aorbitol) VII-10

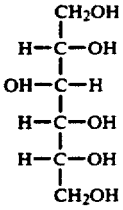

The above cited compounds are easily available as commercial products.

The compounds represented by the formulae (II) to (VII), respectively, are added to a color developer in an amount of preferably from 0.01 to 20 g/l and more preferably from 0.5 to 10 g/l.

In addition, a sulfite, such as sodium sulfite, potassium sulfite, sodium bisulfite, potassium bisulfite, sodium metasulfite, potassium metasulfite, etc., or a carbonyl/-sulfurous acid adduct can be added to a color developer as other preservatives, if desired. An addition amount thereof is preferably 0 to 20 g/l, more preferably 0 to 5 g/l, and a more desirable result can be obtained using the minimum addition amount necessary to preserve the color developer.

Further, various kinds of metals described in Japanese Patent Application (OPI) Nos. 44148/82 and 53749/82, various kinds of saccharides described in Japanese Patent Application (OPI) No. 102727/77, α,α'-dicarbonyl compounds described in Japanese Patent Application (OPI) No. 160141/84, salicylic acids described in Japanese Patent Application (OPI) No. 180588/84, gluconic acid derivatives described in Japanese Patent Application (OPI) No. 75647/81, and so on may be optionally added to a color developer as preservatives. Two or more of these preservatives may be used together, if desired. In particular, addition of aromatic polyhydroxy compounds is preferred.

A color developer which can be used in the present invention is adjusted preferably to pH 9-12, more preferably to pH 9-11.0, and can contain other known developer components.

In order to maintain the above-described pH, various buffers may be used. Suitable examples of buffers which can be used include carbonates, phosphates, borates, tetraborates, hydroxybenzoates, glycine salts, N,N-dimethylglycine salts, leucine salts, norleucine salts, guanine salts, 3,4-dihydroxyphenylalanine salts, alanine salts, aminobutyrates, 2-amino-2-methyl-1,3-propanediol salts, valine salts, proline salts, trishydroxyaminomethane salts, lysine salts, and so on.

Of these buffers, carbonates, phosphates, tetraborates, and hydroxybenzoates are particularly favored over the others as they generally have excellent solubility and buffering ability in the high pH region beyond 9.0, have no adverse effect on photographic properties, such as fogging etc., when added to a color developer, and are available at low prices.

Specific examples of the foregoing preferred buffers include sodium carbonate, potassium carbonate, sodium bicarbonate, potassium bicarbonate, trisodium phosphate, tripotassium phosphate, disodium phosphate, dipotassium phosphate, sodium borate, potassium borate, sodium tetraborate (borax), potassium tetraborate, sodium o-hydroxybenzoate (sodium salicylate), potassium o-hydroxybenzoate, sodium 5-sulfo-2-hydroxybenzoate (sodium 5-sulfosalicylate), potassium 5-sulfo-2-hydroxybenzoate (potassium 5-sulfosalicylate), and so on. However, the invention should not be construed as being limited to the above-mentioned compounds.

Such a buffer as described above is added to the color developer in a concentration of preferably 0.1 mol/l or more, and particularly preferably from 0.1 to 0.4 mol/l of color developer.

Furthermore, various kinds of chelating agents can be used in the color developer for the purpose of preventing calcium and magnesium ions from precipitating or for increasing the stability of the color developer.

Preferred chelating agents are organic acid compounds, with examples including aminopolycarboxylic acids described in Japanese Patent Publication Nos. 30496/69, organic phosphonic acids described in Japanese Patent Application (OPI) No. 97347/81, Japanese Patent Publication No. 39359/81 and West German Pat. No. 2,227,639, phosphonocarboxylic acids described in Japanese Patent Application (OPI) Nos. 102726/77, 42730/78, 121127/79, 126241/80 and 659506/80, and so on, and the compounds described in Japanese Patent Application (OPI) Nos. 195845/83 and 203440/83, Japanese Patent Application No. 40900/78, and so on.

Specific examples of these chelating agents are set forth below. However, the invention should not be construed as being limited to these exemplified compounds.

Representative of such chelating agents are nitrilotriacetic acid, diethylenetriaminepentaacetic acid, ethylenediaminetetraacetic acid, N,N,N-trimethylenephosphonic acid, ethylenediamine-N,N,N',N'-tetramethylenephosphonic acid, transcyclohexanediaminetetraacetic acid, 1,2-diaminopropanetetraacetic acid, glycol ether diminetetraacetic acid, ethylenediamine o-hydroxyphenylacetic acid, 2-phosphonobutane-1,2,4-tricarboxylic acid, 1-hydroxyethylidene-1,1-diphosphonic acid, and N,N'-bis(2-hydroxybenzyl)ethylenediamine-N,N'-diacetic acid.

Two or more of these chelating agent may be used together, if desired.

These chelating agents are added in amounts large enough to block metal ions in the color developer, for example from 0.1 to 10 g/l.

Any development accelerator can be added to the color developer, if needed. From the standpoint of preventing pollution, facility in preparation and prevention of fog generation, however, it is to be desired that the color developer of the present invention should not contain benzyl alcohol in any substantial amount. The expression, "no benzyl alcohol in any substantial amount" as used herein means benzyl alcohol contained in a concentration of 2 ml/l or less and, preferably, benzyl alcohol is completely absent.

The foregoing compounds to be used in the present invention have a remarkable effect even on the stability of the color developer not containing benzyl alcohol in any substantial amount.

As other development accelerators, thioether compounds described in Japanese Patent Publication Nos. 16088/62, 5987/62, 7826/63, 12380/69 and 9019/70, U.S. Pat. No. 3,813,247, and so on, p-phenylenediamine compounds described in Japanese Patent Application (OPI) Nos. 49829/77 and 15554/75, and so on, quaternary ammonium salts described in Japanese Patent Application (OPI) No. 137726/75, Japanese Patent Publication No. 30074/69, Japanese Patent Application (OPI) Nos. 156826/81 and 43429/77, and so on, amine compounds described in U.S. Pat. Nos. 2,494,903, 3,128,182, 4,230,796 and 3,253,919, Japanese Patent Publication No. 11431/66, U.S. Pat. Nos. 2,482,546, 2,597,926 and 3,582,346, and so on, polyalkylene oxides described in Japanese Patent Publication Nos. 16088/62 and 25201/67, U.S. Pat. No. 3,128,183, Japanese Patent Publication Nos. 11431/66 and 23883/67, U.S. Pat. No. 3,532,501, and so on, 1-phenyl-3-pyrazolidones, imidazoles or the like can be added, if needed.

In the present invention, an arbitrary antifoggants can be added, if needed.

As typical examples of antifoggants which can be used, mention may be made of alkali metal halides, such as sodium chloride, potassium bromide and potassium iodide, and organic antifoggants including nitrogen-containing heterocyclic compounds, such as benzotriazole, 6-nitrobenzimidazole, 5-nitroisoindazole, 5-methylbenzotriazole, 5-nitrobenzotriazole, 5-chloro-benzotriazole, 2-thiazolyl-benzimidazole, 2-thiazoylmethylbenzimidazole, indazole, hydroxyazaindolidine and adenine.

The color developer which can be used in the present invention preferably contains a brightening agent. Preferred brightening agents are 4,4'-diamino-2,2'-disulfostilbene compounds. The brightening agent may be added in an amount of from 0 to 5 g/l, and particularly preferably from 0.1 to 4 g/l.

In addition, various kinds of surface active agents, such as alkylsulfonic acids, arylphosphonic acids, aliphatic carboxylic acids, aromatic caboxylic acid and the like, may be added to the color developer, if desired.

The processing temperature of the color developer of the present invention ranges from 20° to 50° C., preferably from 30° to 40° C. and the processing time ranges from 20 seconds to 5 minutes, preferably from 30 seconds to 2 minutes. It is preferred to use a replenisher in a smaller amount. Specifically, the amount ranges from 20 to 600 ml, preferably from 50 to 300 ml, and more preferably from 100 to 200 ml, per square meter of the light-sensitive material processed.

A bleaching bath, a bleach-fix bath, and a fixer, which can be employed in the present invention, are described below.

Any bleaching agent can be used in a bleaching bath or a bleach-fix bath to be employed in the present invention. In particular, Fe(III) complex salts of organic acids, such as aminopolycarboxylic acids (e.g., ethylenediaminetetraacetic acid, diethylenetriaminepentaacetic acid, etc.), organic phosphonic acid (e.g., aminopolyphosphonic acids, phosphonocarboxylic acids, etc.), and other organic acids (e.g., citric acid, tartaric acid, malic acid, etc.); persulfates; hydrogen peroxide; and so on are favored.

Of these bleaching agents, Fe(III) complex salts of organic acids are especially preferred over others from the standpoint of speeding up the development process and preventing environmental pollution.

As specific examples of aminopolycarboxylic acids, aminopolyphosphonic acid, organic phosphonic acids, and salts thereof, which are useful for the formation of organic complex salts of Fe(III), mention may be made of ethylenediaminetetraacetic acid, diethylenetriaminepentaacetic acid, 1,3-diaminopropanetetraacetic acid, propylenediaminetetraacetic acid, nitrilotriacetic acie, cyclohexanediaminetetraacetic acid, methyliminodiacetic acid, iminodiacetic acid, glycol ether diaminetetraacetic acid, and so on.

These compounds may take the form of a sodium, potassium, lithium or ammonium salt. Of the foregoing compounds, Fe(III) complex salts of ethylenediaminetetraacetic acid, diethylenetriaminepentaaectic acid, cyclohexanediaminetetraacetic acid, 1,3-diaminopropanetetraacetic acid and methyliminodiacetic acid are favored over the others because their high bleaching power.

These ferric ion complexes may be used in the form of a complex salt or may be formed in the bath by mixing a ferric salt, e.g., ferric sulfate, ferric chloride, ferric nitrate, ammonium ferric sulfate, ferric phosphate, or so on, with a chelating agent, e.g., an aminopolycarboxylic acid, an aminopolyphosphonic acid, phosphonocarboxylic acid, etc.

Further, the chelating agent may be used in excess of the amount required for ferric ion complexation.

Of the Fe(III) complex salts, aminopolycarboxylic acid-Fe(III) complexes are favored over the others and they are added in an amount of from 0.01 to 1.0 mol/l, preferably from 0.05 to 0.50 mol/l of the bleaching solution or bleach-fixing solution.

In the bleaching bath, the bleach-fix bath and/or prebaths thereof, various kinds of compounds can be used as a bleach accelerator. Preferable examples of bleaching accelerators which can contribute to achievement of high bleaching power include compounds containing a mercapto group or a disulfide linkage described in U.S. Pat. No. 3,893,859, German Pat. No. 1,290,812, Japanese patent application (OPI) No. 95630/78, and Research Disclosure, No. 17129 (July 1978), thiourea compounds described in Japanese Patent Publication No. 8506/70, Japanese patent application (OPI) Nos. 20832/77 and 32735/78, U.S. Pat. No. 3,706,561, and so on, and halides such as iodine ion, bromine ion, etc.

In addition, rehalogenating agents, such as bromides (e.g., potassium bromide, sodium bromide, ammonium bromide, etc.), chlorides (e.g., potassium chloride, sodium chloride, ammonium chloride, etc.) and iodide (e.g., ammonium iodide) can be added to the bleaching or bleach-fix bath to be used in the present invention.

Optionally, one or more of an inorganic or organic acid and an alkali metal or ammonium salt thereof, which have a pH buffering ability, with specific examples including boric acid, borax, sodium metaborate, acetic acid, sodium acetate, sodium carbonate, potassium carbonate, phosphorous acid, phosphoric acid, sodium phosphate, citric acid, sodium citrate, tartaric acid, etc., corrosion inhibitors such as ammonium nitrate, guanidine, etc., and so on can be added.

As for the fixing agent to be used in the bleach-fix bath or the fixer in relation to the present invention, known fixing agents or water-soluble silver halide dissolving agents, such as thiosulfates (e.g., sodium thiosulfate, ammonium thiosulfate, etc.), thiocyanates (e.g., sodium thiocyanate, ammonium thiocyanate, etc.), thioether compounds (e.g., ethylenebisthioglycolic acid, 3,6-dithia-1,8-octanediol, etc.), water soluble silver halide dissolving agent (e.g.,) thioureas, etc., and so on, can be used alone or as a mixture of two or more thereof.

On the other hand, special bleach-fix baths, e.g., those which comprise combinations of fixing agents described in Japanese Patent Application (OPI) No. 155354/80 and large quantities of halides like potassium iodide, can be employed in the present invention.

However, it is particularly preferred to use thiosulfates, especially ammonium thiosulfate, as a fixing agent.

A preferable concentration of the fixing agent ranges from 0.3 to 2 mol/l, particularly from 0.5 to 1.0 mol/l of bleach-fix solution or fixing solution.

A pH range of the bleach-fix bath or the fixer is preferably 3 to 10, and more preferably 5 to 9.

In the bleach-fix bath, various additives, such as a brightening agent, a defoaming agent, a surface active agent, polyvinyl pyrrolidone, and an organic solvent like methanol, can be added.

The bleach-fix bath or the fixer in the present invention contains, as a preservative, sulfite ion-releasing compounds, such as sulfites (e.g., sodium sulfite, potassium sulfite, ammonium sulfite, etc.), bisulfites (e.g., ammonium bisulfite, sodium bisulfite, potassium bisulfite, etc.), metabisulfites (e.g., potassium metabisulfite, sodium metabisulfite, ammonium metabisulfite, etc.), and the like. A preferred concentration of these preservatives ranges from about 0.02 to 0.50 mol sulfite ion/l, particularly 0.04 to 0.40 mol sulfite ion/l.

Although it is conventional to add sulfites as a preservative, other preservatives, such as ascorbic acid, carbonyl/bisulfite adducts, carbonyl compounds, etc., may be added.

Further, buffers, brightening agents, chelating agents, defoaming agents, antiseptics, and so on may be added, if needed.

After a desilvering step, e.g., after a fixation, bleach-fix or like step, the silver halide color photographic material of the present invention is, in general, subjected to a washing step and/or a stabilizing step.

The volume of washing water required can be determined based upon the characteristics of the photosensitive materials to be processed (specifically, depending, e.g., on what kinds of the couplers are incorporated therein), end-use purposes of the photosensitive materials to be processed, the temperature of the washing water, the number of washing tanks (stage number), how the washing water is replenished (as to, e.g., whether or not a current of water flows counter the direction, the photosensitive materials are moved during development processing, and other conditions.

In particular, the relation between the number of washing tanks and the volume of washing water in a multistage counter current process can be determined using the method described in Journal of the Society of Motion Picture and Television Engineers, vol. 64, pages 248–253 (May 1955). A preferred stage number in the multistage counter current process is, in general, from 2 to 6, particularly from 2 to 4.

According to the multistage counter current process, a volume of washing water can be sharply reduced, for example, to below 0.5–1 liter per square meter of the photosensitive material processed. However, the process suffers from the disadvantage that bacteria propagate themselves in the tanks because of an increase in staying time of water in the tanks. Suspended matter produced from the bacteria sticks to the photosensitive materials processed therein.

As a means of solving such a problem in the processing of the color photosensitive material of the present invention, reducing the amount of calcium and magnesium, which is described in Japanese Patent Application 131632/86, incorporated herein by reference, can be employed to enormous advantage.

Further, bactericides such as isothiazolone compounds and thiabendazoles described in Japanese Patent Application (OPI) No. 8542/82, chlorine-containing germicides such as the sodium salt of chlorinated isocyanuric acid, benzotriazoles described in European Pat. No. 204197, copper ion, and other germicides described in Hiroshi Horiguchi Bohkin Bohbai Zai no Kagaku (which means "Chemistry of Antibacteria and Antimold"), Biseibutsu no Mekkin, Sakkin, Bohbai no Kagaku (which means "Arts of sterilizing and pasteurizing microbe, and proofing against mold") compiled by Eisei Gijutsu Kai, and Bohkin Bobizai Jiten (which means "Thesaurus of Antibacteria and Antimold") compiled by Nippon Bohkin-Bohbi Gakkai.

Further, a surface active agent as a water draining agent, and a chelating agent represented by EDTA as a water softener can be used in washing water.

Washing water to be used in the processing of the photosensitive material of the present invention is adjusted to pH 4–10, and preferably to pH 5–9. The temperature of the washing water and the washing time can be set to various values depending on, e.g., the characteristics and the usage and the usage of the photosensitive material. In general, the temperature and time are in the range of from 15° to 45° C. and from 20 sec. to 10 min., preferably from 25° to 40° C. and from 30 sec. to 5 min., respectively.

Also, the photosensitive material of the present invention can be processed with a stabilizer without using the above-described washing water.

In the stabilizer are added compounds having an image-stabilizing function, for example, aldehyde compounds represented by formaldehyde, buffers for adjusting the pH in a film to a value suitable for stabilization of dyes, ammonium compounds, and so on.

Further, the above-described antibacteria and antimold agents can be used in the stabilizing bath in order to prevent bacteria from propagating themselves in the bath and to impart a mold proofing property to the processed photosensitive material.

Furthermore, a surface active agent, a brightening agent and a hardener can be added to the stabilizer.

When stabilization is carried out directly without a washing step in the processing of the sensitive material of the present invention, all the methods described, e.g., in Japanese Patent Application (OPI) Nos. 8543/82, 14834/83, 18343/84, 220345/85, 238832/85, 239784/85, 239749/85, 4054/86 and 11879/86, and so on can be employed.

In other preferred embodiments, chelating agents such as 1-hydroxyethylidene-1,1-diphosphonic acid, ethylenediaminetetramethylenephosphonic acid, magnesium compounds and bismuth compounds are used in the stabilizer.

A solution used in the washing and/or the stabilizing step can further be used in a pre-step thereof. For instance, the overflow of washing water, which is reduced in amount by employing the multistage counter current process, is streamed into a pre-bath or a bleach-fix bath. Therein, the bleach-fix bath is replenished with a concentrated replenishing solution, resulting in a reduction of waste.

The method of the present invention can be applied to any development process as long as a color developer is used therein. For instance, it can be applied to the processing of color paper, color reversal paper, color direct-positive photosensitive materials, color positive films, color negative films, color reversal films, and so on. In particular, the application to color paper and color reversal paper is preferred over other applications.

The silver halide emulsion in the photosensitive materials which can be used in the present invention may have any halide composition, e.g., silver iodobromide, silver bromide, silver chlorobromide, silver chloride, etc.

More specifically, in the case of rapid processing or low replishment processing of color paper or the like, silver chlorobromide emulsions having a silver chloride content of 60 mol % or more and a silver chloride emulsion are preferred and those having a chloride content of 80 to 100 mol % are particularly favored.

When it is necessary to achieve high sensitivity and to control generation of fog during preparation, storage, and/or processing to a particularly low level, silver chlorobromide emulsions having a bromide content of 50 mol % or more and a silver bromide emulsion (which each may have an iodide content of 3 mol % or less) are preferred, and those having a bromide content of not less than 70 mol % are more preferred.

In color photographic materials for taking photographs, silver iodobromide and silver chloroiodobromide are preferred, wherein the iodide content is preferably from 3 to 15 mol %.

The interior and the surface of the silver halide grains which can be employed in the photosensitive materials to be used in the present invention may differ in halide composition. The silver halide grains may have a conjunction structure of a multilayer structure, or the silver halide grains may be uniform throughout.

The silver halide grains of the above-described kinds may be present as a mixture.

A mean grain size of silver halide grains to be employed in the present invention (the grain size herein refers to the grain diameter when the grains are spherical or approximately spherical in shape, while it refers to the edge length when the grains are cubic grains. In both cases, it is represented by the mean based on the projection areas of grains and when the grains are tabular, it refers to a projection areas calculated on a basis of area of circle) ranges preferably from 0.1 micron to 2 microns, particularly preferably from 0.15 micron to 1.5 micron. The grain size distribution may be narrow or broad. However, a so-called monodispersed silver halide emulsion having a variation coefficient (which refers to the value obtained by dividing the standard deviation in the granularity distribution curve of the silver halide emulsions by the mean grain size) not exceeding 20%, particularly preferably 15% or less, is preferred for use in the photosensitive material employed in the present invention. In order to obtain sufficient image density gradation, two or more monodispersed silver halide emulsions (preferably having their variation coefficients in the above-described range) having substantially the same color sensitivity, but differing in grain size, can be coated in a single layer as a mixed emulsion, or can be coated separately in a multilayer form.

Also, a combination of two or more polydispersed silver halide emulsions, or a combination of a monodispersed emulsion and a polydispersed emulsion can be coated in a single layer or in a multilayer.

The silver halide grains to be employed in photosensitive material used in the present invention may have a regular crystal form, such as that of a cube, an octahedron, a rhombododecahedron or a tetradecahedron, or an irregular crystal form, such as that of a sphere or so on. Also, the grains may have a composite form of these crystal forms. Moreover, the grains may have a tabular form in which the diameter is greater than the thickness by a factor of 5 or more, and particularly preferably 8 or more. An emulsion which contains tabular grains as described above in a fraction of 50% or more on a basis of the total projection area of all the grains therein may be employed. An emulsion which contains silver halide grains having various kinds of crystals forms as a mixture may be employed. These various kinds of emulsions may be either those which form latent image predominantly at the surface of the grains, or those which mainly form a latent image inside the grains.

Hotographic emulsions which can be used in photographic material employed in the present invention can be prepared using methods described in Research Disclosure, vol. 170, Item No. 17643, Section I, II, III (December 1978).

The emulsions of photographic material employed in the present invention are generally ripened physically and chemically and further sensitized spectrally. Additives to be used in these steps are described in Research Disclosure, vol. 176, No. 17643 (December 1978) and vol. 187, No. 18716 (November 1979), and where descriptions thereof are given are set forth together in the following table.

Photographic additives which can be used in the present invention are also described in the above-described two literature references, and where they are described are also tabulated in the following table.

| Additives | RD 17643 | RD 18716 |
|---|---|---|
| 1. Chemical sensitizers | p. 23 | p. 643, right column ~ |
| 2. Sensitivity-increasing agents | | p. 643, right column ~ |
| 3. Spectral sensitizers | p. 23–24 | p. 643, right column ~ |
| 4. Supersensitizers | | p. 649, right column ~ |
| 5. Brightening agents | p. 24 | |
| 6. Antifoggant and stabilizers | p. 24–25 | p. 649, right column |
| 7. Coupler | p. 25 | |
| 8. Organic solvent | p. 25 | |
| 9. Light absorbants, Filter dyes | p. 25–26 | p. 649, right colum to p. 650, left column |
| 10. UV-ray absorbents | | |
| 11. Stain inhibitor | p. 25, right col. | p. 650, left column to right column |
| 12. Dye image-stabilizing agents | p. 25 | |
| 13. Hardeners | p. 26 | p. 651, left column |
| 14. Binders | p. 26 | p. 651, left column |
| 15. Plasticizers and Lubricants | p. 27 | p. 650, right column |
| 16. Coating aids and Surface active agents | p. 26–27 | p. 650, right column |
| 17. Antistatic agents | p. 27 | p. 650, right column |

Various kinds of color couplers can be used in photographic materials employed in the present invention. The term color coupler as used herein refers to a compound capable of producing a dye by a coupling reaction with the oxidation product of an aromatic primary amine developing agent. Representatives of useful color couplers are naphthol or phenol compounds, pyrazolone or pyrazoloazole compounds, and open-chain or heterocyclic ketomethylene compounds. Specific examples of such cyan, magenta and yellow couplers which can be used in the preent invention are described in the patents cited in Research Disclosure (RD) No. 17643, Section VII-D (December 1978) and ibid., No. 18717 (November 1979).

It is desirable that the color couplers to be incorporated in the photosensitive material should be rendered nondiffusible by containing a ballast group or taking a polymerized form.

Moreover, two-equivalent color couplers which have a coupling eliminable group at the coupling active site are preferred to four-equivalent ones having a hydrogen atom at that site, because the amount of silver per unit area of photosensitive material can be reduced. Couplers which can be converted to dyes having a moderate diffusibility as the result of color development, colorless couplers, DIR couplers which can release development inhibitors in proportion as the coupling reaction proceeds, and couplers capable of releasing development accelerators upon the coupling reaction can also be employed.

As representatives of the yellow couplers which may be used in the present invention, mention may be made of oil-protected acylacetonamide couplers. Specific examples of such couplers are described in U.S. Pat. Nos. 2,407,210, 2,875,057 and 3,265,506, and so on.

In the present invention, two-equivalent yellow couplers are preferably employed and typical representatives thereof are yellow couplers of the type which have a splitting-off group attached to the coupling active site via its oxygen, as described, e.g., in U.S. Pat. Nos. 3,408,194, 3,447,928, 3,933,501 and 4,022,620, and yellow couplers of the type which have a splitting-off group attached to the coupling active site via its nitrogen, as described, e.g., in Japanese Patent Publication No. 10739/80, U.S. Pat. Nos. 4,401,752 and 4,326,024, RD 18053 (April 1979), British Pat. No. 1,425,020, and West German Patent Application (OLS) Nos. 2,219,917, 2,261,361, 2,329,587 and 2,433,812.

Of these yellow couplers, α-pivaloylacetoanilide couplers are of great advantage in that they can produce dyes excellent in fastness, especially to light, and α-benzoylacetoanilide couplers have an advantage in that they can ensure high color density to developed image.

Magenta couplers which may be employed in the present invention include those of oil-protected indazolone or cyanoacetyl type, and preferably those of pyrazoloazole type, such as 5-pyrazolones, pyrazolotriazoles and the like. Of 5-pyrazolone couplers, those having an arylamino group or an acylamino group at the 3-position are preferred over others from the standpoint of the superiorities in hue and color density of the developed dyes. Typical examples thereof are described in U.S. Pat. Nos. 2,311,082, 2,343,703, 2,600,788, 2,908,573, 3,062,655, 3,152,896 and 3,936,015, and so on. As for the splitting-off groups of two-equivalent 5-pyrazolone couplers, groups which can split off at the nitrogen site, as described in U.S. Pat. No. 4,310,619, and arylthio groups described in U.S. Pat. No. 4,351,897 are particularly preferable. Also, ballast group-containing 5-pyrazolone couplers described in European Pat. No. 73,636 can provide high color density of developed images.

Specific examples of magenta couplers of the pyrazoloazole type include pyrazolobenzimidazoles described in U.S. Pat. No. 3,369,879 and, preferably, pyrazolo[5,1-c][1,2,4]triazoles described in U.S. Pat. No. 3,725,067, pyrazolotetrazoles described in RD 24220 (June 1984) and pyrazolopyrazoles described in RD 24230 (June 1984). From the viewpoint of smallness of yellow side-absorption and excellence of light fastness of the developed dyes, imidazo[1,2-b]pyrazoles described in European Pat. No. 119,741 are preferred, and pyrazolo[1,5-b][1,2,4]-triazoles described in European Pat. No. 119,860 are particularly favored over others.

Cyan couplers which may be used in photosensitive materials employed in the present invention include couplers of the oil-protected naphthol and phenol types. Representatives of the naphthol couplers described in U.S. Pat. No. 2,474,293, and more preferably two-equivalent naphthol couplers of the type which have a splitting-off group attached to the coupling active site via its oxygen, as described in U.S. Pat. Nos. 4,052,212, 4,146,396, 4,228,233 and 4,296,200. Specific examples of phenol type cyan couplers are described in U.S. Pat. Nos. 2,369,929, 2,801,171, 2,772,162 and 2,895,826, and so on.

Cyan couplers fast to moisture and temperature are preferably used in photosensitive materials employed in the present invention. Typical examples thereof include phenol type cyan couplers which have an alkyl group containing 2 or more carbon atoms at the meta-position of the phenol nucleus as described in U.S. Pat. No. 3,772,002, couplers of 2,5-diacylamino-substituted phenol type as described in U.S. Pat. Nos. 2,772,162, 3,758,308, 4,126,396, 4,334,011 and 4,327,173, West German Patent Application (OLS) No. 3,329,729, Japanese Patent Application (OPI) No. 166956/84, and so on, and phenol couplers having a phenylureido group at the 2-position and an acylamino group at the 5-position, as described in U.S. Pat. Nos. 3,446,622, 4,333,999, 4,451,559, and 4,427,767, and so on.

In particularly, low fog density and excellent photographic properties can be obtained by using at least one cyan coupler represented by the following general formula (C-I) in the processing method of the present invention.

Formula (C-I) is described in detail below.

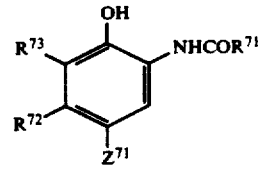

(C-1)

In the above formula, $R^{71}$ represents an alkyl group, a cycloalkyl group, an aryl group, an amino group, or a heterocyclic group. $R^{72}$ represents an acylamino group or an alkyl group containing 2 or more carbon atoms. $R^{73}$ represents a hydrogen atom, a halogen atom, an alkyl group, an alkoxy group, or may combine with $R^{72}$ to form a ring. $Z^{71}$ represents a hydrogen atom, a halogen atom, or a group eliminable in the reaction with the oxidation product of an aromatic primary amine color developing agent.

Alkyl groups preferred as $R^{71}$ in formula (C-1) include those containing 1 to 32 carbon atoms, such as methyl butyl, tridecyl, cyclohexyl, allyl, etc., preferred aryl groups are, e.g., phenol groups and naphthyl groups, and preferred heterocyclic groups are, e.g., 2-pyridyl groups, 2-furyl groups and the like.

As for the amino group represented by $R^{71}$, phenyl substituted amino groups which may have a substituent group are particularly preferred.

Further, groups represented by $R^{71}$ may be further substituted with a group selected from among an alkyl group, an aryl group, an alkoxy group or an aryloxy group (e.g., a methoxy group, a dodecyloxy group, a methoxyethoxy group, a phenyloxy group, a 2,4-di-tert-amylphenoxy group, a 3-tert-butyl-4-hydroxyphenyloxy group, a naphthyloxy group, etc.), a carboxyl group, an alkylcarbonyl or arylcarbonyl group (e.g., an acetyl group, a tetradecanoyl group, a benzoyl group, etc.), an alkoxycarbonyl group or an aryloxycarbonyl group (e.g., a methoxycarbonyl group, a phenoxycarbonyl group, etc.), an acyloxy group (e.g., an acetyloxy group, a benzoyloxy group, etc.), a sulfamoyl group (e.g., an N-ethylsulfamoyl group, an N-octadecylsulfamoyl group, etc.), carbamoyl group (e.g., an N-ethylcarbamoyl group, an N-methyl-dodecylcarbamoyl group, etc.), a sulfonamido group (e.g., a methanesulfonamideo group, a benzenesulfonamido group, etc.), an acylamino group (e.g., an acetylamino group, a benzamido group, an ethoxycarbonylamino group, a phenylaminocarbonylamino group, etc.), an imido group (e.g., a succinimido group, a hydantoinyl group, etc.), a sulfonyl group (e.g., a methanesulfonyl group, etc.), a hydroxy group, a cyano group, a nitro group, and a halogen atom.

$Z^{71}$ in formula (C-I) represents a hydrogen atom, or a coupling eliminable group, with specific examples including a halogen atom (e.g., a fluorine atom, a chlorine atom, and a bromine atom, etc.), an alkoxy group (e.g., a dodecyloxy group, a methoxycarbamoylmethoxy group, a carboxypropyloxy group, a methylsulfonylethoxy group, etc.), an aryloxy group (e.g., a 4-chlorophenoxy group, a 4-methoxyphenoxy group, etc.), an acyloxy group (e.g., an acetoxy group, a tetradecanoyloxy group, a benzoyloxy group, etc.), a sulfonyloxy group (e.g., a methanesulfonyloxy group, a toluenesulfonyloxy group etc.), an amido group (e.g., a cycloacetylamino group, a methanesulfonylamino group, a toluenesulfonylamino group, etc.), an alkoxycarbonyloxy group (e.g., an ethoxycarbonyloxy group, a benzyloxycarbonyloxy group, etc.), an aryloxycarbonyloxy group (e.g., a phenoxycarbonyloxy group, etc.), an aliphatic or aromatic thio group (e.g., phenylthio group, a tetrazolylthio group, etc.), an imido group (e.g., a succimimido group, a hydantoinyl group, etc.), an N-containing heterocyclic group (e.g., a 1-pyrazolyl group, a 1-benzotriazolyl group, etc.), an aromatic azo group (e.g., a phenylazo group, etc.), and so on. These coupling eliminable groups may contain a photographically useful group.

The cyan coupler of formula (C-I) may form a polymer (including a dimer) via $R^{71}$ or $R^{72}$.

Specific examples of cyan couplers represented by the foregoing formula (C-I) are illustrated below. However, the invention should not be construed as being limited to the following examples.

(C-1)

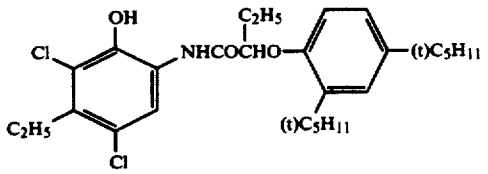

(C-2)

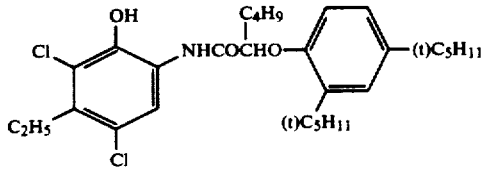

(C-3)

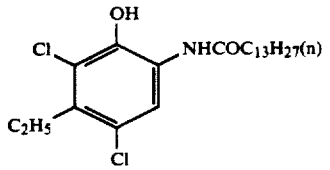

(C-4)

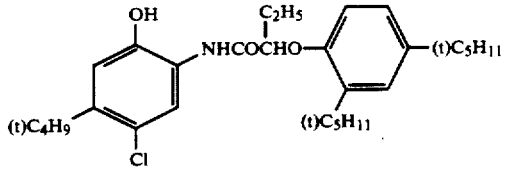

(C-5)

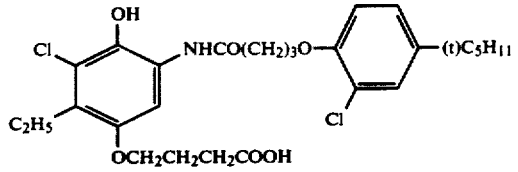

(C-6)

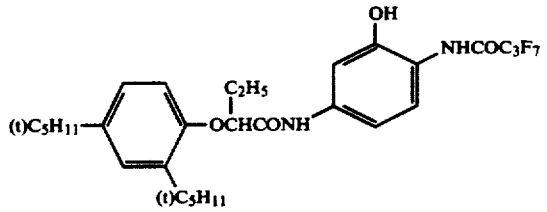

(C-7)

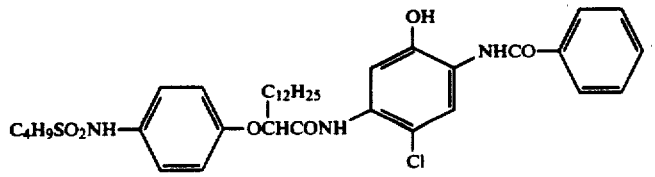

-continued
(C-8)
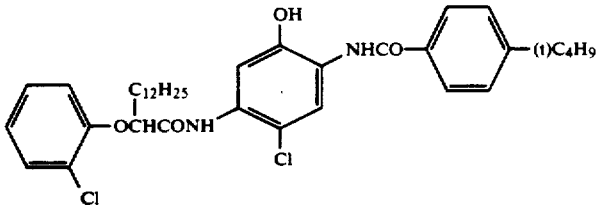
(C-9)
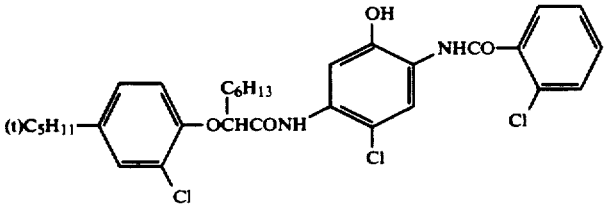
(C-10)
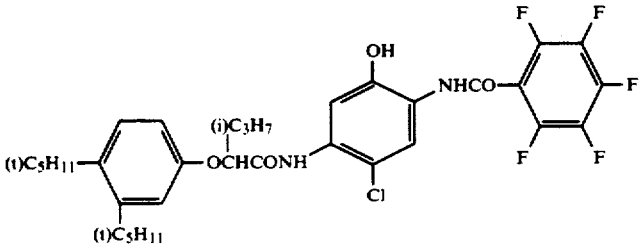
(C-11)
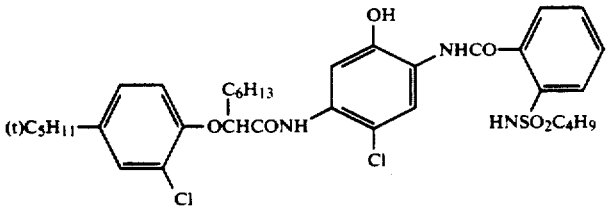
(C-12)
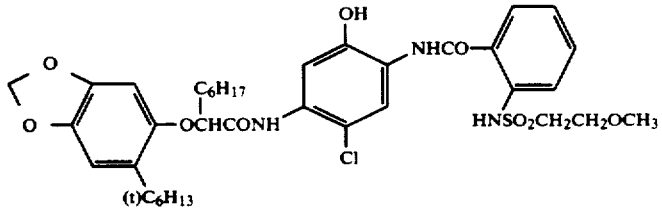
(C-13)
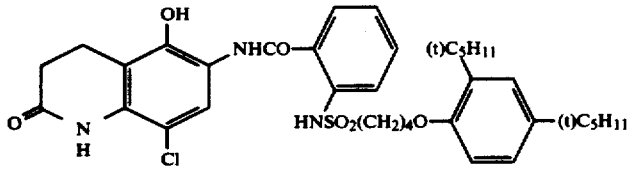
(C-14)
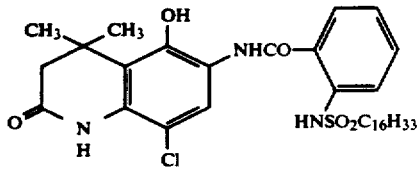

-continued
(C-15)
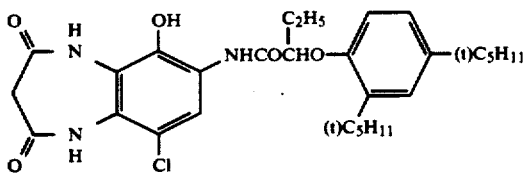
(C-16)
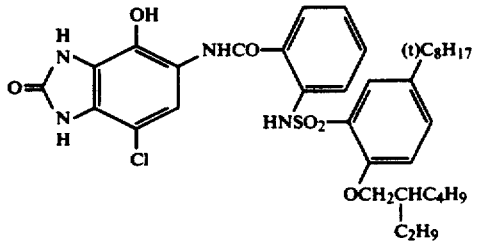
(C-17)
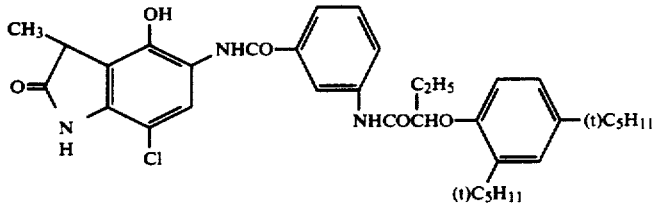
(C-18)
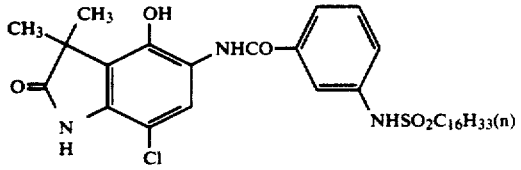
(C-19)
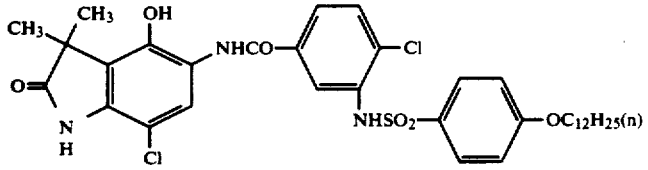
(C-20)
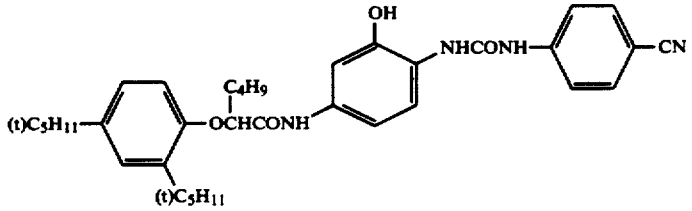
(C-21)
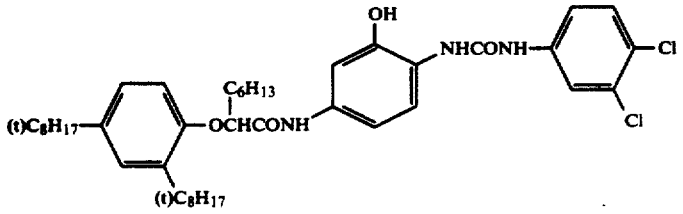

-continued (C-22)

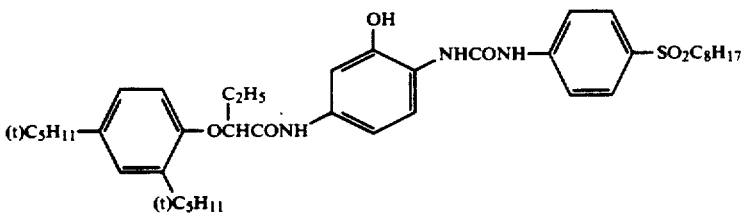

(C-23)

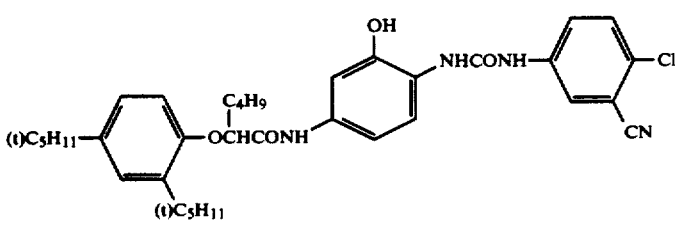

(C-24)

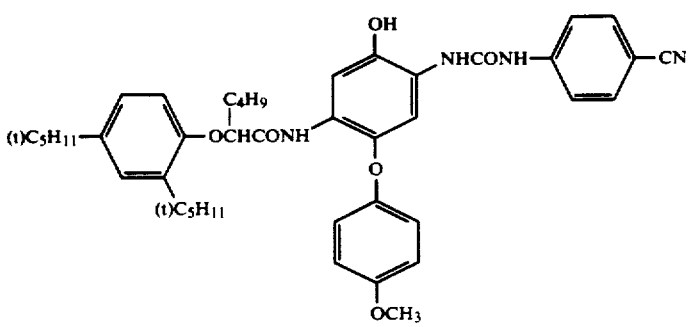

(C-25)

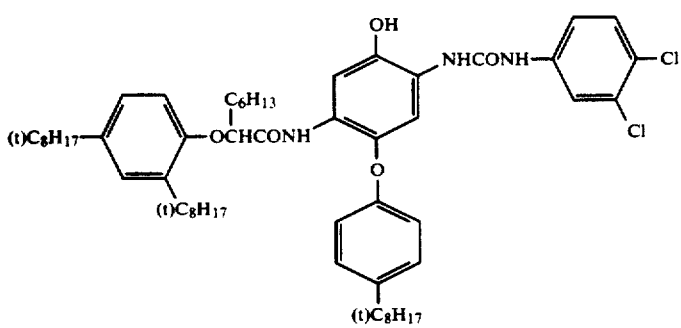

(C-26)

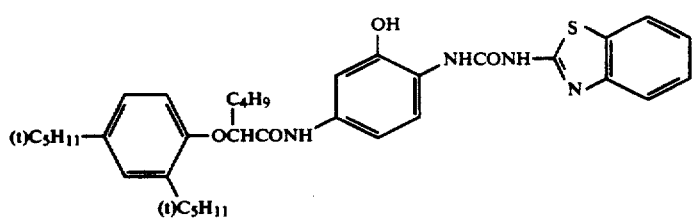

The cyan couplers represented by the foregoing formula (C-I) can be synthesized on the basis of descriptions in Japanese Patent Application (OPI) No. 166956/84, Japanese Patent Publication No. 11572/74, and so on.

Couplers which can produce dyes having moderate diffusibility can be used together with the above-described couplers, whereby granularity can be improved. Specific examples of the diffusable dye-producing magenta couplers are described in U.S. Pat. No. 4,366,237 and British Pat. No. 2,125,570, while in European Pat. No. 96,570 and West German Patent Application (OLS) No. 3,234,533 are described those of yellow, magenta and cyan couplers of the foregoing kind. Dye forming couplers and the above-described special couplers may assume a polymerized form (including a dimerized form). Typical examples of polymerized couplers are described in U.S. Pat. Nos. 3,451,820 and 4,080,211. Further, specific examples of polymerized magenta couplers are described in British Pat. No. 2,102,173 and U.S. Pat. No. 4,367,282.

Two or more of various kinds of couplers which can be employed in photosensitive material employed in the present invention can be incorporated in the same light-sensitive layer or the same coupler can be incorporated in two or more different layers, depending on characteristics required of the photosensitive material to be produced.

The couplers to be employed in the present invention can be incorporated into a photosensitive material using various known dispersing methods. For instance, high boiling organic solvents to be used in oil-in-water dispersion methods are cited in U.S. Pat. No. 2,322,027. Processes in latex dispersion methods, effects of said methods, and specific examples of latexes for impregnation are described in U.S. Pat. No. 4,199,363, West German Patent Application (OLS) Nos. 2,541,274 and 2,541,230, and so on.

The standard amount of color coupler used ranges from 0.001 to 1 mole per mole of light-sensitive silver halide. A preferred amount of yellow coupler used ranged from 0.01 to 0.5 mole, that of magenta coupler from 0.003 to 0.3 mole, and that of cyan coupler from 0.002 to 0.3 mole.

The photographic material to be used in the present invention comprises a support and at least one photosensitive emulsion layer thereon. Emulsions are coated on a flexible support, such as a plastic film (e.g., a cellulose nitrate film, a cellulose acetate film, a polyethylene terephthalate film, etc.), paper, etc., or a rigid support like glass. Details of supports and coating methods are described in Research Disclosure, vol. 176, Item 17643, Section XV (p. 27), Section XVII (p. 28) (December 1978).

In the present invention, a reflective support is preferred.

A "reflective support" can render dye images formed in silver halide emulsion layers clear through its high reflectivity. Such a reflective support as described above includes a support coated with a hydrophobic resin in which a light-reflecting substance, e.g., titanium oxide, zinc oxide, calcium carbonate, calcium sulfate, etc., is dispersed and a film of a hydrophobic resin containing a light-reflecting substance in a dispersed condition.

The present invention is illustrated in more detail by reference to the following examples. Unless stated otherwise, all parts, percents and ratios are by weight.

EXAMPLE 1

A processing solution having the following formula was prepared as a color developer.

| Color Developer | |
|---|---|
| Compound (A) (Compound of the present invention) | described in Table 1 |
| Compound (B) (Hydroxylamines or the like) | described in Table 1 |
| Sodium Sulfite | 0.2 g |
| Potassium Carbonate | 30 g |
| EDTA.2Na | 1 g |
| Sodium Chloride | 1.5 g |
| 4-Amino-3-methyl-N-ethyl-N-[β-(methanesulfonamido)ethyl]aniline Sulfate fate | 5.0 g |
| Brightening Agent (of 4,4'-diminostilbene type), UVITEX-CK, produced by Ciba Geigy Ltd. | 3.0 g |
| Water to make | 1,000 ml |
| pH adjusted to | 10.05 |

Samples of the thus prepared color developer (No. 1 to No. 20) were placed in separate test tubes designed so as to have an aperture rate (aperture area/sample area) of 0.05 $cm^{-1}$, and allowed to stand for 4 weeks at 35° C. After the lapse of 4 weeks, each decrement due to evaporation was supplemented with distilled water, and a residual rate of the aromatic primary amine color developing agent in each same was determined by liquid chromatography.

The results are shown in Table 1 below.

TABLE 1

| Sample No. | Compound (A)*1 0.03 mol/l | Compound (B)*2 0.04 mol/l | Note | Residual Rate*3 of Agent (%) |
|---|---|---|---|---|
| 1 | — | II-14 | Comparison | 7 |
| 2 | — | II-13 | " | 15 |
| 3 | Triethanolamine | II-14 | " | 75 |
| 4 | Polyethyleneimine*4 | " | " | 63 |
| 5 | $Na_2SO_3$ | " | " | 75 |
| 6 | I-1 | II-3 | Invention | 90 |
| 7 | " | II-13 | " | 91 |
| 8 | " | II-14 | " | 93 |
| 9 | I-4 | II-3 | " | 87 |
| 10 | " | II-13 | " | 89 |
| 11 | " | II-14 | " | 89 |
| 12 | I-11 | II-3 | " | 87 |
| 13 | " | II-13 | " | 87 |
| 14 | " | II-14 | " | 87 |
| 15 | I-1 | N,N-diethylhydrazine | " | 93 |
| 16 | " | Glucose | " | 87 |
| 17 | " | Dihydroxyacetone | " | 86 |
| 18 | — | N,N-diethylhydrazine | Comparison | 30 |
| 19 | — | Glucose | " | ~0 |
| 20 | — | Dihydroxyacetone | " | 11 |

*1Indication by the number of the compound exemplified in this specification.
*2Indication by the number of the compound exemplified in this specification.
*3Residual rate of developing agent (%) = $\frac{\text{Concentration of residual developing agent}}{5.0\ g/l} \times 100$
*4$-(CH_2CH_2NH)_n-$ n = 500 to 2,000

As can be clearly seen from the data in Table 1, the residual rate of the developing agent was improved by additional use of such a compound as triethanol amine, polyethyleneimine or sodium sulfite, (Sample No. 3, 4 or 5), compared with the independent use of Compound (B), such as hydroxylamine or diethylhydroxylamine, (Sample No. 1 or 2). However, the improvement produced by such a combined use as described above was insufficient.

On the other hand, as can be seen from the data of Samples Nos. 6 to 17, the use of the compound represented by the formula (I) was able to raise remarkably the residual rate of the developing agent, that is, effected the improvement in preservability of the color developer.

EXAMPLE 2

An integral multilayer color paper was prepared by coating layers so as to have the layer structure described in Table A on a paper support laminated with polyethylene on both sides thereof. The coating compositions employed therein were prepared in the following manner.

Preparation of Coating Composition for First Layer

To 19.1 g of the yellow coupler (a) and 4.4 g of the color image stabilizer (b) were added 27.2 ml of ethyl acetate and 7.7 ml of the solvent (c) to prepare a solution. The solution was dispersed, in an emulsified condition, into 185 ml of a 10% aqueous gelating solution containing 8 ml of a 10% solution of sodium dodecylbenzenesulfonate.

Separately, a blue sensitizing dye having the chemical structure illustrated below was added to a silver chlorobromide emulsion (having a bromide content of 1.0 mole %, and containing 70 g of Ag per kg of emulsion) in an amount of $5.0\times10^{-4}$ mole per mole of silver to prepare a blue-sensitive emulsion.

The foregoing emulsified dispersion was mixed with the blue-sensitive emulsion and dissolved therein. Then, the resulting emulsion was so adjusted as to have the composition shown in Table A.

Coating compositions for second to seventh layers were prepared in analogy with that of the first layer. In each of the constituent layers, sodium salt of 1-oxy-3,5-dichloro-s-triazine was used as gelatin hardener.

Spectral sensitizing dyes used in the respective emulsion layers are as follows:

Blue-sensitive Emulsion Layer

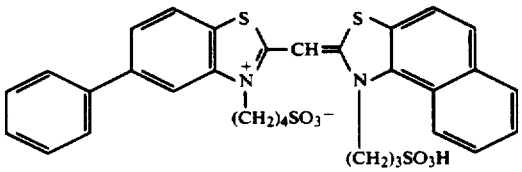

($5.0\times10^{-4}$ mole per mole of silver halide)

Green-sensitive Emulsion Layer

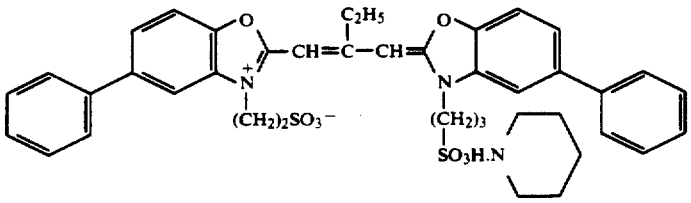

($4.0\times10^{-4}$ mole per mole of silver halide) and

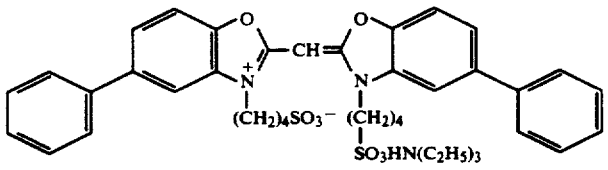

($7.0\times10^{-5}$ moler per mole of silver halide)

Red-sensitive Emulsion Layer

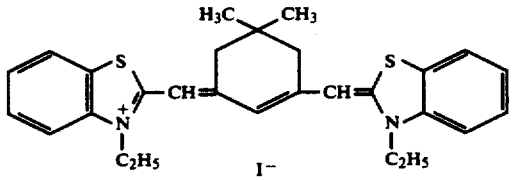

($0.9\times10^{-4}$ mole per mole of silver halide)

In the red-sensitive emulsion layer, the following compound was incorporated in an amount of $2.6\times10^{-3}$ mole per mole of silver halide.

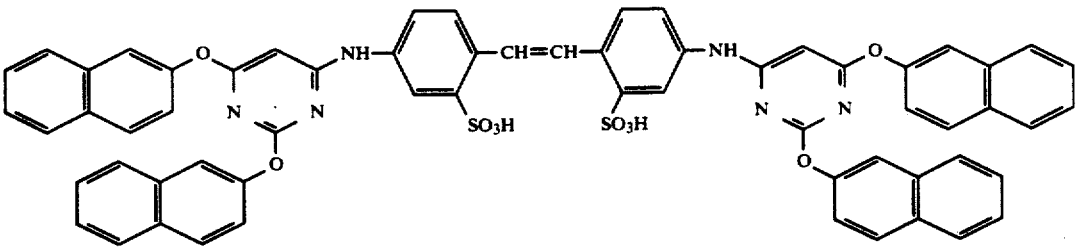

In the blue-sensitive emulsion layer, the green-sensitive emulsion layer and the red-sensitive emulsion layer was further incorporated 1-(5-methylureidophenyl)-5-mercaptotetrazole in amounts of $8.5\times10^{-5}$ mole, $7.7\times10^{-4}$ mole and $7.5\times10^{-4}$ mole, respectively, per mole of silver halide.

The following dyes were added to the emulsion layers for prevention of irradiation:

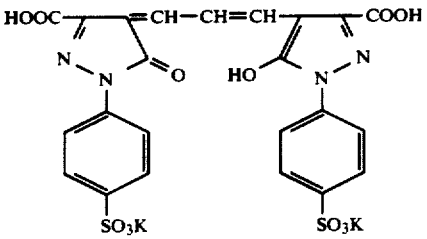

-continued and

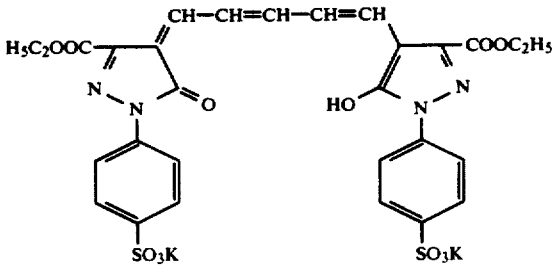

TABLE A

| Layer | Main Ingredients | Amount used | |
|---|---|---|---|
| 7th Layer (Protective layer) | Gelatin | | 1.33 g/m$^2$ |
| | Acryl-denatured polyvinyl alcohol (denaturing degree: 17%) | | 0.17 g/m$^2$ |
| | Liquid paraffin | | 0.03 g/m$^2$ |
| 6th Layer (Ultraviolet absorbing layer) | Gelatin | | 0.53 g/m$^2$ |
| | Ultraviolet absorbent (i) | | 0.21 g/m$^2$ |
| | Solvent (k) | | 0.08 g/m$^2$ |
| 5th Layer (Red sensitive emulsion layer) | Silver halide emulsion (silver bromide: 1 mol %) | silver: | 0.23 g/m$^2$ |
| | Gelatin | | 1.34 g/m$^2$ |
| | Cyan coupler (l) | | 0.34 g/m$^2$ |
| | Color image stabilizer (m) | | 0.17 g/m$^2$ |
| | Polymer (n) | | 0.40 g/m$^2$ |
| | Solvent (o) | | 0.23 g/m$^2$ |
| 4th Layer (Ultraviolet absorbing layer) | Gelatin | | 1.58 g/m$^2$ |
| | Ultraviolet absorbent (i) | | 0.62 g/m$^2$ |
| | Color stain inhibitor (j) | | 0.05 g/m$^2$ |
| | Solvent (k) | | 0.24 g/m$^2$ |
| 3rd Layer (Green sensitive emulsion layer) | Silver halide emulsion (silver bromide: 0.5 mol %) | silver: | 0.36 g/m$^2$ |
| | Gelatin | | 1.24 g/m$^2$ |
| | Magenta coupler (e) | | 0.31 g/m$^2$ |
| | Color image stabilizer (f) | | 0.25 g/m$^2$ |
| | Color image stabilizer (g) | | 0.12 g/m$^2$ |
| | Solvent (h) | | 0.42 g/m$^2$ |
| 2nd Layer (Color stain inhibiting layer) | Gelatin | | 0.99 g/m$^2$ |
| | Color stain inhibitor (d) | | 0.08 g/m$^2$ |
| 1st Layer (Blue sensitive emulsion layer) | Silver halide emulsion (silver bromide: 1.0 mol %) | silver: | 0.30 g/m$^2$ |
| | Gelatin | | 1.86 g/m$^2$ |
| | Yellow coupler (a) | | 0.82 g/m$^2$ |
| | Color image stabilizer (b) | | 0.19 g/m$^2$ |
| | Solvent (c) | | 0.35 g/m$^2$ |
| Support | Polyethylene-laminated paper (containing white pigment ($TiO_2$) and bluish pigment (ultramarine) in polyethylene laminate on the 1st layer side) | | |

TABLE A-continued
(a) Yellow Coupler
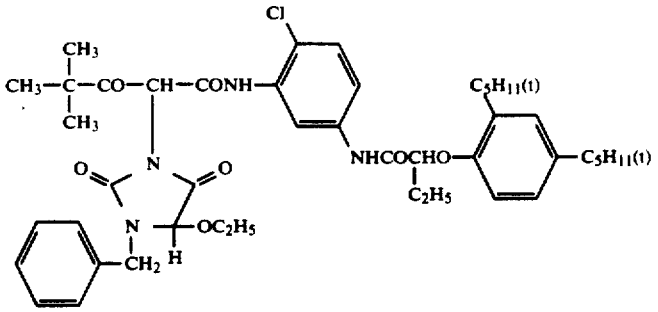
(b) Color Image Stabilizer
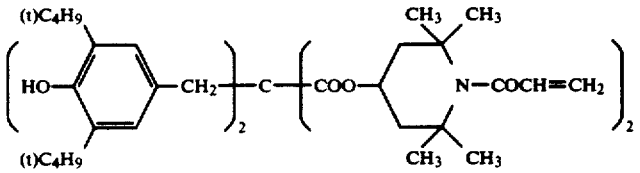
(c) Solvent
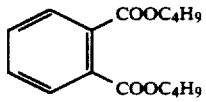
(d) Color Stain Inhibitor
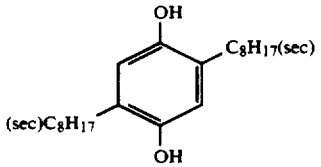
(e) Magenta Coupler
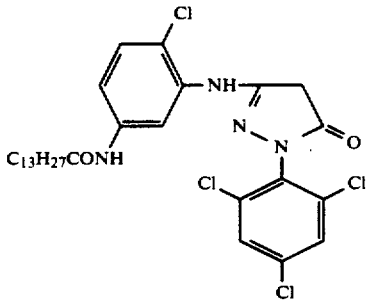
(f) Color Image Stabilizer
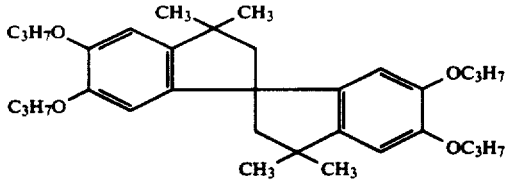
(g) Color Image Stabilizer
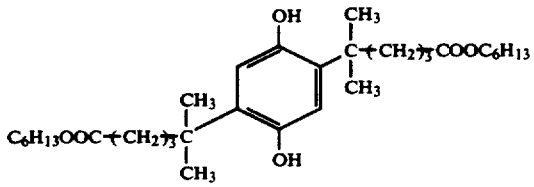
(h) Solvent
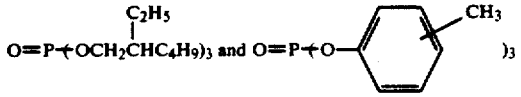
1:1 Mixture (by volume)

TABLE A-continued
(i) Ultraviolet Absorbent
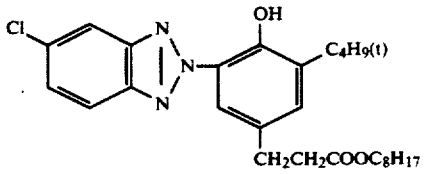
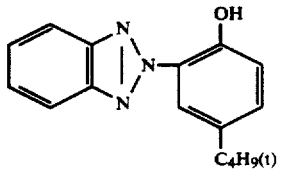
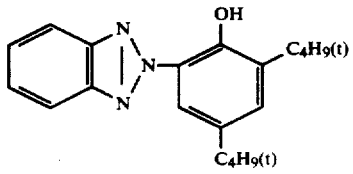
2:9:8 Mixture (by weight)
(j) Color Stain Inhibitor
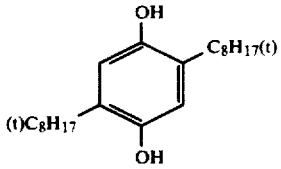
(k) Solvent
$O{=}P{\leftarrow}O{-}C_9H_{19}(iso))_3$
(l) Cyan Coupler
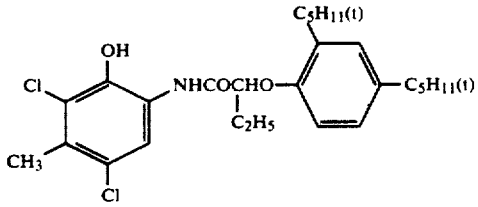
and
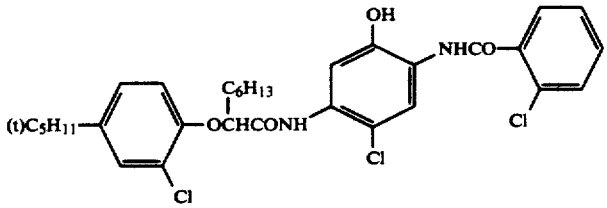
1:1 Mixture (by mole)
(m) Color Image Stabilizer
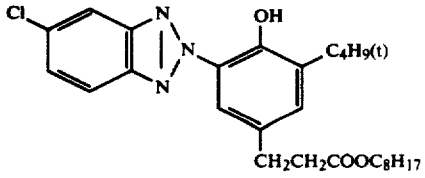

TABLE A-continued

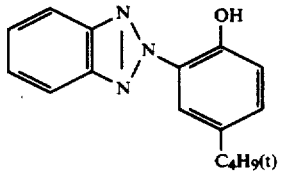

and

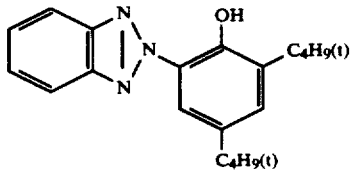

5:8:9 Mixture (by weight)

(n) Polymer

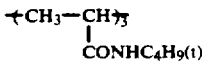

mean molecular weight: 35,000

(o) Solvent

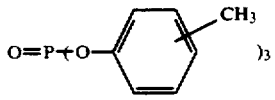

The color photographic paper obtained was subjected to the following processing steps in which color developers with different compositions were used.

| Processing Step | Temperature | Time |
|---|---|---|
| Color development | 35° C. | 45 sec. |
| Bleach-fix | 35° C. | 45 sec. |
| Stabilization 1 | 35° C. | 20 sec. |
| Stabilization 2 | 35° C. | 20 sec. |
| Stabilization 3 | 35° C. | 20 sec. |
| Drying | 70-80° C. | 60 sec. |

The stabilization step was carried out according to the three-stage counter current washing process, in which the stabilizing solution flowed from Stabilization Table 3 to Stabilization Tank 1. Processing solutions employed in the foregoing steps, respectively, are described below.

| Color Developer | |
|---|---|
| Additive C (Hydroxylamines, etc.) | described in Table 2 |
| Additive D (Compound of Invention) | described in Table 2 |
| Benzyl Alcohol | described in Table 2 |
| Diethylene Glycol | described in Table 2 |
| Sodium Sulfite | 0.2 g |
| Potassium Carbonate | 30 g |
| Nitrilotriacetic Acid | 1 g |
| Sodium Chloride | 1.5 g |
| Color Developing Agent (described in Table 2) | 0.01 mole |
| Brightening Agent (UVITEX CK, produced by Ciba Geigy Ltd.) | 3.0 g |
| Water to make | 1,000 ml |
| pH adjusted to | 10.05 |
| **Bleach-Fix Bath** | |
| EDTA Fe(III)$NH_4$.2$H_2O$ | 60 g |
| EDTA.2Na.2$H_2O$ | 4 g |
| Ammonium Thiosulfate (70%) | 120 ml |

-continued

| | |
|---|---|
| Sodium Sulfite | 16 g |
| Glacial Acetic Acid | 7 g |
| Water to make | 1,000 ml |
| pH adjusted to | 5.5 |
| **Stabilizer** | |
| Formaldehyde (37%) | 0.1 ml |
| 1-Hydroxyethylidene-1,1-diphosphonic Acid (60%) | 1.6 ml |
| Bismuth Chloride | 0.35 g |
| Aqueous Ammonia (26%) | 2.5 ml |
| Trisodium Nitrilotriacetate | 1.0 g |
| EDTA.4H | 0.5 g |
| Sodium Sulfite | 1.0 g |
| 5-Chloro-2-methyl-4-isothiazolin-3-one | 50 mg |
| Water to make | 1,000 ml |

Separately, a portion of each color developer described above was placed in 1-liter beaker, allowed to stand in contact with the atmosphere for 21 days at 35° C., and then subjected to the foregoing processing steps.

The processing with the color developer which had been allowed to stand for 21 days (aged developer was called "aged developer tests", and the processing carried out using the color developer before storage was called "fresh developer tests".

Photographic properties obtained with the fresh developer tests and the aged developer tests are shown in Table 2.

The photographic properties were represented by Dmin and gradation determined by magenta density measurements.

Dmin refers to minimum density and gradation is represented by the difference in density between the point of 0.5 and the point corresponding to log E which is 0.3 greater than that corresponding to the density of 0.5.

The results are shown in Table 2 below.

TABLE 2

| Experiment No. | Color developing agent* | Benzyl alcohol/diethylene glycol (ml/ml) | Additive C (0.04 mol) | Additive D (0.03 mol) | Developer | Fresh Developer Dmin | Fresh Developer gradation | Aged Developer Dmin | Aged Developer gradation |
|---|---|---|---|---|---|---|---|---|---|
| 1 | (d) | 15/10 | II-13 | Triethanolamine | Comparison | 0.14 | 0.75 | 0.20 | 0.85 |
| 2 | (d) | — | " | " | " | 0.13 | 0.71 | 0.18 | 0.82 |
| 3 | (d) | — | " | Polyethylenimine | " | 0.13 | 0.71 | 0.18 | 0.81 |
| 4 | (d) | — | II-14 | Triethanolamine | " | 0.13 | 0.49 | 0.21 | 0.52 |
| 5 | (a) | — | II-13 | I-1 | Invention | 0.13 | 0.65 | 0.15 | 0.70 |
| 6 | (b) | — | " | " | " | 0.13 | 0.73 | 0.15 | 0.77 |
| 7 | (c) | — | " | " | " | 0.13 | 0.73 | 0.15 | 0.78 |
| 8 | (d) | — | " | " | " | 0.13 | 0.73 | 0.13 | 0.74 |
| 9 | (a) | | " | I-7 | " | 0.13 | 0.64 | 0.15 | 0.70 |
| 10 | (b) | | " | " | " | 0.13 | 0.72 | 0.15 | 0.76 |
| 11 | (c) | | " | " | " | 0.13 | 0.72 | 0.15 | 0.77 |
| 12 | (d) | | " | " | " | 0.13 | 0.72 | 0.13 | 0.74 |
| 13 | (d) | 15/10 | " | " | " | 0.14 | 0.75 | 0.16 | 0.80 |
| 14 | (a) | — | " | I-2 | " | 0.13 | 0.72 | 0.16 | 0.78 |
| 15 | (b) | — | " | " | " | 0.13 | 0.73 | 0.16 | 0.77 |
| 16 | (c) | — | " | " | " | 0.13 | 0.73 | 0.15 | 0.78 |
| 17 | (d) | — | " | " | " | 0.13 | 0.74 | 0.13 | 0.75 |
| 18 | (a) | — | II-3 | I-1 | " | 0.13 | 0.74 | 0.16 | 0.80 |
| 19 | (b) | — | " | " | " | 0.13 | 0.75 | 0.15 | 0.79 |
| 20 | (c) | — | " | " | " | 0.13 | 0.75 | 0.16 | 0.79 |
| 21 | (d) | — | " | " | " | 0.13 | 0.75 | 0.13 | 0.76 |
| 22 | (d) | — | Glucose | " | " | 0.13 | 0.74 | 0.13 | 0.76 |

*Color developing agents (a) to (d) are illustrated below.

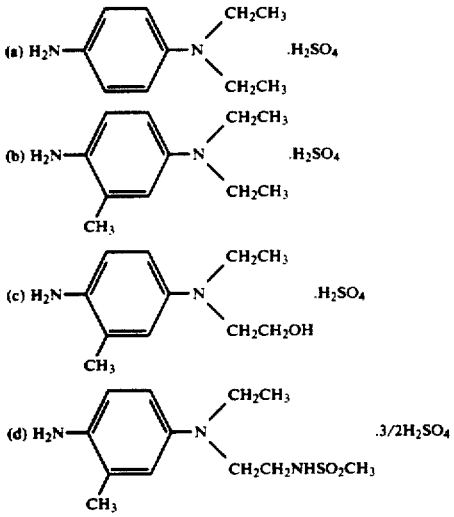

As can be seen from the data of Table 2, aging of the color developers caused changes in Dmin and caused gradation to increase contrast in experiments No. 1 to No. 4 while in experiments No. 5 to No. 22 changes in Dmin and gradation when using the aged developers were very small, that is, the stability of photographic properties was notably improved.

In further detail, changes in Dmin and gradation were smallest in experiments No. 8, No. 17 and No. 21 among the experiments from No. 5 to No. 8 and from No. 14 to No. 21. Accordingly, it turned out that compound (d), the structure of which was illustrated hereinafter, was the most desirable color developing agent.

EXAMPLE 3

Another color photographic paper was prepared in the same manner as in Example 2, except the bromine ion content in the green-sensitive emulsion was changed to 80 mol %. After wedgewise exposure, changes in photographic properties caused by using aged color developers were evaluated by reference to generation of fog.

As for the developers used for comparison, the aged developers brought about a great incease in fog.

On the other hand, the increase in fog density caused by the use of aged developers of the present invention was small and good photographic properties were maintained.

EXAMPLE 4

After wedgewise exposure, the color photographic paper prepared in the same manner as in Example 2 was subjected to the following processing steps, wherein various kinds of color developers underwent a running development process test in which the process was continued until the amount of replenisher used became equal to three times the tank volume.

| Processing Step | Temperature | Time | Amount of Replenisher |
|---|---|---|---|
| Color Development | 35° C. | 45 sec. | 160 ml/m$^2$ |
| Bleach-Fix | 35° C. | 45 sec. | 100 ml/m$^2$ |
| Rinsing 1 | 30° C. | 20 sec. | |
| Rinsing 2 | 30° C. | 20 sec. | |
| Rinsing 3 | 30° C. | 20 sec. | 200 ml/m$^2$ |
| Drying | 60–70° C. | 30 sec. | |

As water for the rinsing solution, ion exchange water (calcium and magnesium concentrations were each below 3 ppm) was used. The rinsing step was carried out according to the three-stage counter current process, in which the rinsing solution flowed from Rinsing Tank 3 to Rinsing Tank 1.

Processing solutions employed in the foregoing steps, respectively, are described below.

| Color Developer | Tank Solution | Replenisher |
|---|---|---|
| Additives C and D | described in Table 3 | |
| Brightening Agent (4,4-diaminostilbene type) | 3.0 g | 4.0 g |
| Ethylenediamine-tetraacetic Acid | 1.0 g | 1.5 g |
| Potassium Carbonate | 30.0 g | 30.0 g |
| Sodium Chloride | 1.4 g | 0.1 g |
| 4-Amino-3-methyl-N-ethyl-N-[β-(methanesulfonamido)-ethyl]aniline Sulfate | 5.0 g | 7.0 g |
| Benzyl alcohol | described in Table 3 | |
| Diethylene Glycol | described in Table 3 | |
| 1,2-Dihydroxybenzene-3,4,6-trisulfonic Acid | 300 mg | 300 mg |
| Water to make | 1,000 ml | 1,000 ml |
| pH adjusted to | 10.10 | 10.50 |

| Bleach-Fix Bath (The replenisher was the same as the tank solution) | |
|---|---|
| EDTA $Fe(III)NH_4.2H_2O$ | 60 g |
| $EDTA.2Na.2H_2O$ | 4 g |
| Ammonium Thiosulfate (70%) | 120 ml |
| Sodium Sulfite | 16 g |
| Glacial Acetic Acid | 7 g |
| Water to make | 1,000 ml |
| pH adjusted to | 5.5 |

| Rinsing Solution (The replenisher was the same as the tank solution) | |
|---|---|
| Formaldehyde (37%) | 0.1 g |
| Adduct of Formaldehyde and Sulfurous Acid | 0.7 g |
| 5-Chloro-2-methyl-4-isothiazoline-3-one | 0.02 g |
| 2-Methyl-4-isothiazoline-3-one | 0.01 g |
| Copper Sulfate | |
| Water to make | 1,000 ml |
| pH (at 25° C.) adjusted to | 4.0 |

The development process was carried out using the foregoing processing solutions in accordance with the foregoing processing steps, respectively. Blue(B), Green(G), and red(R) densities on the unexposed areas (stain densities) were measured at the beginning and the conclusion of running processing with a self-resistering densitometer produced by Fuji Photo Film Co., Ltd.

In addition, samples which had received development processing were allowed to stand (aged) for one month, starting from the conclusion of development processing, for one month, at 80° C. (5 to 10% RH). Thereafter, B, G and R densities on the unexposed areas were measured again.

The results of changes in photographic properties are shown in Table 3.

TABLE 3

| Experiment No. | Benzyl Alcohol/Diethylene Glycol: Tank Solution | Benzyl Alcohol/Diethylene Glycol: Replenisher | Additive C 0.04 mol | Additive D 0.03 mol | Developer | Increment of Dmin: B | Increment of Dmin: G | Increment of Dmin: R | Dmin after one month's lapse at 80° C.: B | Dmin after one month's lapse at 80° C.: G | Dmin after one month's lapse at 80° C.: R |
|---|---|---|---|---|---|---|---|---|---|---|---|
| 1 | — | — | II-13 | Triethanolamine | Comparison | +0.10 | +0.06 | +0.06 | +0.30 | +0.20 | +0.10 |
| 2 | 15/10 | 20/10 | " | " | Comparison | +0.15 | +0.10 | +0.08 | +0.33 | +0.22 | +0.10 |
| 3 | — | — | II-3 | " | Comparison | +0.11 | +0.07 | +0.08 | +0.31 | +0.21 | +0.11 |
| 4 | 15/10 | 20/10 | " | " | Comparison | +0.16 | +0.12 | +0.10 | +0.33 | +0.23 | +0.11 |
| 5 | 15/10 | 20/10 | II-14 | I-1 | Invention | +0.03 | +0.01 | ±0 | +0.15 | +0.10 | +0.04 |
| 6 | — | — | " | " | Invention | +0.01 | 0 | 0 | +0.11 | +0.05 | +0.02 |
| 7 | 15/10 | 20/10 | II-3 | " | Invention | +0.03 | +0.01 | 0 | +0.16 | +0.11 | +0.05 |
| 8 | — | — | " | " | Invention | ±0 | +0 | 0 | +0.10 | +0.05 | +0.03 |
| 9 | — | — | II-13 | I-2 | Invention | +0.01 | ±0 | 0 | +0.12 | +0.07 | +0.03 |
| 10 | — | — | II-3 | " | Invention | +0.01 | ±0 | 0 | +0.12 | +0.06 | +0.03 |
| 11 | — | — | Glucose | I-1 | Invention | +0.01 | +0.01 | 0.01 | +0.13 | +0.08 | +0.05 |
| 12 | — | — | N,N-Diethylhydrazine | " | Invention | +0.01 | ±0 | 0 | +0.12 | +0.06 | +0.03 |
| 13 | — | — | Hydroxyacetone | " | Invention | +0.01 | +0.01 | 0 | +0.13 | +0.07 | +0.04 |

As can be seen from the data in Table 3, stains were much increased in experiments No. 1 to No. 4 as the result of the development process, while increments of stains were very small in experiments No. 5 to No. 13.

As for the changes with the lapse of time after the conclusion of photographic processing, increases of stain in experiments No. 5 to No. 13 were very small compared with those in experiments No. 1 to No. 4.

EXAMPLE 5

As described in Table C below, an integral multilayer color paper was prepared by coating the first (the lowest) layer to the seventh (uppermost) layer, in that order, on a paper support which has been laminated with polyethylene on both sides and has undergone a corona discharge treatment. The coating compositions used therein were prepared in the following manner (structural formulae of couplers, names of color image stabilizers and so on which were used in the coating compositions are described hereinafter).

The coating composition for the first layer was prepared in the following manner.

To 200 g of a yellow coupler, 93.3 g of a discoloration inhibitor, 10 g of the high boiling solvent (p) and 5 g of the solvent (q) was added 600 ml of ethyl acetate as an auxiliary solvent. The resulting mixture was heated to 60° C. to make a solution. The solution was mixed with 3,300 ml of a 5% aqueous gelatin solution containing 330 ml of a 5% aqueous solution of Alkanol B (trade name of alkylnaphthalene sulfonate produced by Du Pont).

Then the mixed solution was emulsified with a colloid mill to prepare a coupler dispersion. From the emulsion, ethyl acetate was distilled away under reduced pressure.

The resulting dispersion was added to 1,400 g of an emulsion (containing 96.7 g of Ag and 170 g of gelatin) to which a sensitizing dye for a blue-sensitive emulsion layer and 1-methyl-2-mercapto-5-acetylamino-1,3,4-triazole had been added.

Further, 2,600 g of a 10% aqueous gelatin solution was added to the resulting emulsion to prepare a coating composition.

Coating compositions for the second to seventh layers were prepared by analogy with that of the first layer according to the formulae described in Table C.

As for the cyan coupler in the fifth layer, cyan couplers set forth in Table 4 were employed respectively for preparing each photographic paper.

TABLE C

| Layer | Main Ingredients | Amount used |
|---|---|---|
| 7th Layer (Protective layer) | Gelatin | 600 mg/m$^2$ |
| 6th Layer (Ultraviolet absorbing layer) | Ultraviolet absorbent (n) | 260 mg/m$^2$ |
| | Ultraviolet absorbent (o) | 70 mg/m$^2$ |
| | Solvent (p) | 300 mg/m$^2$ |
| | Solvent (q) | 100 mg/m$^2$ |
| | Gelatin | 700 mg/m$^2$ |
| 5th Layer (Red sensitive emulsion layer) | Silver chlorobromide emulsion (silver bromide: 1 mol %) | silver: 210 mg/m$^2$ |
| | Cyan coupler (See Table 4) | $5 \times 10^{-4}$ mol/m$^2$ |
| | Color stain inhibitor (r) | 250 mg/m$^2$ |
| | Solvent (p) | 160 mg/m$^2$ |
| | Solvent (q) | 100 mg/m$^2$ |
| | Gelatin | 1800 mg/m$^2$ |
| 4th Layer (Color stain inhibiting layer) | Color stain inhibitor (s) | 65 mg/m$^2$ |
| | Ultraviolet absorbent (n) | 450 mg/m$^2$ |
| | Ultraviolet absorbent (o) | 230 mg/m$^2$ |
| | Solvent (p) | 50 mg/m$^2$ |
| | Solvent (q) | 50 mg/m$^2$ |
| | Gelatin | 1700 mg/m$^2$ |
| 3rd Layer (Green sensitive emulsion layer) | Silver chlorobromide emulsion (silver bromide: 0.5 mol %) | silver: 305 mg/m$^2$ |
| | Magenta Coupler | 670 mg/m$^2$ |
| | Color stain inhibitor (t) | 150 mg/m$^2$ |
| | Color stain inhibitor (u) | 10 mg/m$^2$ |
| | Solvent (p) | 200 mg/m$^2$ |
| | Solvent (q) | 10 mg/m$^2$ |
| | Gelatin | 1400 mg/m$^2$ |
| 2nd Layer (Color stain inhibiting layer) | Silver bromide emulsion (emulsion has not received after-ripening and has an average grain size of 0.05 micron) | silver: 10 mg/m$^2$ |
| | Color stain inhibitor (s) | 55 mg/m$^2$ |
| | Solvent (p) | 30 mg/m$^2$ |
| | Solvent (q) | 15 mg/m$^2$ |
| | Gelatin | 800 mg/m$^2$ |
| 1st Layer (Blue sensitive emulsion layer) | Silver chlorobromide emulsion (silver bromide: 1.0 mol %) | silver: 290 mg/m$^2$ |
| | Yellow coupler | 600 mg/m$^2$ |
| | Color stain inhibitor (r) | 280 mg/m$^2$ |
| | Solvent (p) | 30 mg/m$^2$ |
| | Solvent (q) | 15 mg/m$^2$ |
| | Gelatin | 800 mg/m$^2$ |
| Support | Paper support laminated with polyethylene on both sides. | |

(n) 2-(2-Hydroxy-3,5-di-tert-amylphenyl)benzotriazole.
(o) 2-(2-Hydroxy-3,5-di-tert-butylphenyl)benzotriazole.
(p) Di-(2-ethylhexyl)phthalate.
(q) Dibutyl phthalate.
(r) 2,5-Di-tert-amylphenyl-3,5-di-tert-butylhydroxybenzoate.
(s) 2,5-Di-tert-octylhydroquinone.
(t) 1,4-Di-tert-amyl-2,5-dioctyloxybenzene.
(u) 2,2'-Methylenebis(4-methyl-6-tert-butylphenol).

The following compounds were used as sensitizing dyes for their respective emulsion layers.

Blue-sensitive emulsion layer: Anhydro-5-methoxy-5'-methyl-3,3'-disulfopropylselenacyanine hydroxide.

Green-sensitive emulsion layer: Anhydro-9-ethyl-5,5'-diphenyl-3,3'-disulfoethyloxacarbocyanine hydroxide.

Red-sensitive emulsion layer: 3,3'-diethyl-5-methoxy-9,9'-(2,2-dimethyl-1,3-propano)thiadicarbocyanine iodide.

As a stabilizer for each emulsion layer, 1-methyl-2-mercapto-5-acetylamino-1,3,4-triazole was used.

As irradiation inhibiting dyes, dipotassium 4-(3-carboxy-5-hydroxy-4-(3-(3-carboxy-5-oxo-1-(4-sulfonatophenyl)-12-pyrazolin-4-ylidene)-1-propenyl)-1-pyrazolyl)benzenesulfonate and tetrasodium N,N-(4,8-dihydroxy-9,10-dioxo-3,7-disulfonatoanthracen-1,5-diyl)bis(aminomethanesulfonate) were used.

As a hardener, 1,2-bis(vinylsulfonyl)ethane was used.

The structural formulae of the couplers used are illustrated below.

Yellow Coupler

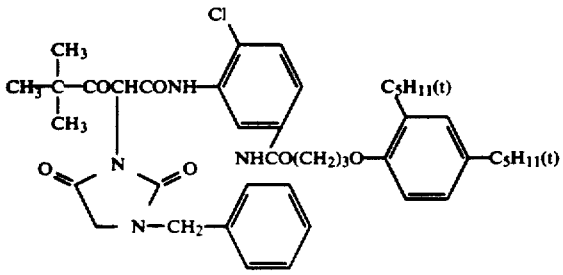

Cyan Coupler

See Table 4

After wedgewise exposure, the integral multilayer color photographic paper obtained was subjected to the following processing steps.

| Processing Step | Time | Temperature |
|---|---|---|
| Color development | 3 min. 30 sec. | 33° C. |
| Bleach-fix | 1 min. 30 sec. | 33° C. |
| Rinsing (3-tank cascade) | 2 min. | 30° C. |
| Drying | 1 min. | 80° C. |

Processing solutions employed in the foregoing steps, respectively, are described below.

| | |
|---|---|
| **Color Developer** | |
| Water | 800 ml |
| Sodium sulfite | See Table 4 |
| N,N'-bis(2-hydroxybenzyl)ethylenediamine-N,N'-diacetic Acid | 0.1 g |
| Nitrilo-N,N,N-trimethylenephosphonic Acid (40%) | 1.0 g |
| Potassium Bromide | 1.0 g |
| Additives C and D | See Table 4 |
| Potassium Carbonate | 30 g |
| N-ethyl-N-(β-methanesulfonamidoethyl)-3-methyl-4-aminoaniline Sulfate | 5.5 g |
| Brightening Agent (4,4'-diaminostilbene type) | 1.0 g |
| Water to make | 1,000 ml |
| KOH to adjust pH to | 10.10 |
| **Bleach-Fix Bath** | |
| Ammonium Thiosulfite (70%) | 150 ml |
| Sodium Sulfite | 15 g |
| Ammonium Ethylenediamineferrate (III) | 60 g |
| Ethylenediaminetetraacetic Acid | 10 g |
| Brightening Agent (4,4'-diaminostilbene type) | 1.0 g |
| 2-Mercapto-5-amino-3,4-thiadiazole | 1.0 g |
| Water to make | 1,000 ml |
| Aqueous Ammonia to adjust pH to | 7.0 |
| **Rinsing Solution** | |
| 5-Chloro-3-methyl-4-isothiazole-3-one | 40 mg |
| 2-Methyl-4-isothiazolin-3-one | 10 mg |
| 2-Octyl-4-isothiazole-3-one | 10 mg |
| Bismuth Chloride (40%) | 0.5 g |
| Nitrilo-N,N,N-trimethylenephosphonic Acid (40%) | 1.0 g |
| 1-Hydroxyethylidene-1,1-diphosphonic Acid (60%) | 2.5 g |
| Brightening Agent (4,4'-diaminostilbene type) | 1.0 g |
| Aqueous Ammonia (26%) | 2.0 ml |
| Water to make | 1,000 ml |
| KOH to adjust pH to | 7.5 |

In the foregoing color development step, the fresh developer and the aged developer, obtained by a allowing a portion of the fresh developer to stand for 21 days, were used separately. Dmin and the gradation of the cyan dye image in each photographic development process were examined in the same manner as in Example 2.

Increases in Dmin and gradation, respectively, using the aged developer over those using the fresh developer are shown in Table 4 below.

TABLE 4

| Experiment No. | Cyan Coupler* | Sodium Sulfite (g/l) | Additive C 0.04 mol/l | Additive D 0.03 mol/l | Developer | Changes in Photographic Properties Dmin | Gradation |
|---|---|---|---|---|---|---|---|
| 1 | C-9 | 1.8 | II-13 | Triethanolamine | Comparison | +0.06 | +0.19 |
| 2 | C-1 | 1.8 | " | " | " | +0.06 | +0.18 |
| 3 | " | 0 | " | " | " | +0.05 | +0.13 |
| 4 | (A) | 1.8 | " | I-1 | Invention | +0.04 | +0.09 |
| 5 | (B) | 1.8 | " | " | " | +0.04 | +0.08 |
| 6 | C-9 | 1.8 | " | " | " | +0.01 | +0.09 |
| 7 | C-1 | 1.8 | " | " | " | +0.01 | +0.08 |
| 8 | (A) | 0 | " | " | " | +0.03 | +0.06 |
| 9 | (B) | 0 | " | " | " | +0.03 | +0.05 |
| 10 | C-9 | 0 | " | " | " | 0 | +0.01 |
| 11 | C-1 | 0 | " | " | " | 0 | +0.01 |
| 12 | (A) | 1.8 | II-3 | I-2 | " | +0.03 | +0.08 |
| 13 | C-1 | 1.8 | " | " | " | +0.01 | +0.08 |
| 14 | (A) | 1.0 | " | " | " | +0.03 | +0.07 |
| 15 | C-1 | 1.0 | " | " | " | +0.01 | +0.06 |
| 16 | (A) | 0 | " | " | " | +0.03 | +0.04 |
| 17 | C-9 | 0 | " | " | " | 0 | 0 |

TABLE 4-continued

| Experiment No. | Cyan Coupler* | Sodium Sulfite (g/l) | Additive C 0.04 mol/l | Additive D 0.03 mol/l | Developer | Changes in Photographic Properties Dmin | Gradation |
|---|---|---|---|---|---|---|---|
| 18 | C-1 | 0 | " | " | " | 0 | 0 |

*Cyan couplers (A) and (B) are illustrated below.

(A)

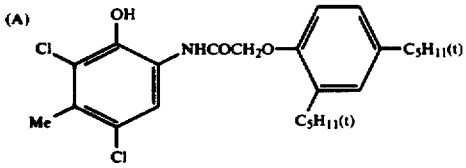

(B)

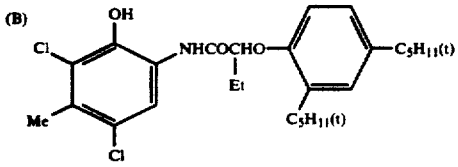

As can be seen from the data in Table 4, changes in Dmin and gradation resulting from using the developer allowed to stand for 21 days were small in experiments Nos. 4 to No. 18 compared those in experiments No. 1 to No. 3. That is, the photographic properties have turned out to be highly stabilized in experiments No. 4 and No. 18.

In particular, it has been found that the preservability of the developer was higher and the photographic properties were more highly stabilized when using C-9 or C-1 as a cyan coupler (in experiment Nos. 6, 7, 10, 11, 13, 15, 17 and 18) and when the developer contained sulfurous acid in low concentration (in experiment Nos. 10, 11, 17 and 18).

EXAMPLE 6

As integral multilayer color paper was prepared by coating layers so as to have the layer structure described in Table D below on a paper support laminated with polyethylene on both sides thereof. The coating compositions employed therein were prepared in the following manner.

Preparation of the Coating Composition for First Layer

To 19.1 g of the yellow coupler (a) and 4.4 g of the color image stabilizer (b) were added 27.2 ml of ethyl acetate and 7.7 ml of the solvent (c) to prepare a solution. The solution was dispersed, in an emulsified condition, into 185 ml of a 10% aqueous gelatin solution containing 8 ml of a 10% solution of sodium dodecylbenzenesulfonate.

Separately, the blue sensitizing dye having the chemical structure illustrated below was added to a silver chlorobromide emulsion (having a bromide content of 90.0 mol %, and containing 70 g of Ag per kg of emulsion) in an amount of $5.0\times10^{-4}$ mole per mole of silver to prepare a blue-sensitive emulsion.

The foregoing emulsified dispersion was mixed with the blue-sensitive emulsion, and dissolved therein. Then, the resulting emulsion was so adjusted as to have the composition shown in Table D.

Coating compositions for the second to seventh layers were prepared in analogy with that of the first layer.

In each of the constituent layers, sodium salt of 1-oxy-3,5-dichloro-s-triazine was used as gelatin hardener.

Spectral sensitizing dyes used in the respective emulsion layers are as follows:

Blue-sensitive Emulsion Layer

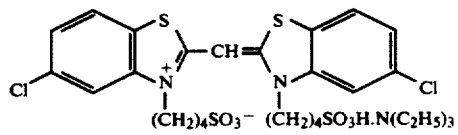

($5.0\times10^{-4}$ mole per mole of silver halide)

Green-sensitive Emulsion Layer

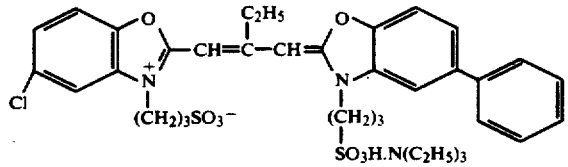

($4.0\times10^{-4}$ mole per mole of silver halide) and

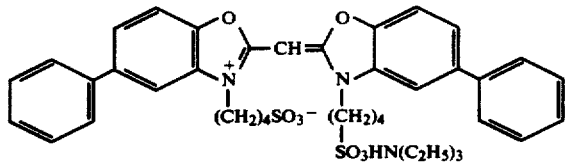

($7.0\times10^{-5}$ mole per mole of silver halide)

Red-sensitive Emulsion Layer

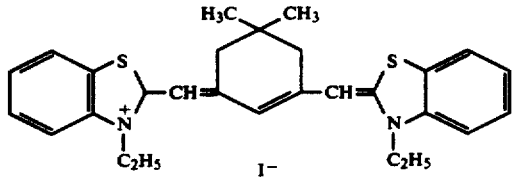

($0.9\times10^{-4}$ mole per mole of silver halide)

In the red-sensitive emulsion layer, the following compound was incorporated in an amount of $2.6\times10^{-3}$ mole per mole of silver halide.

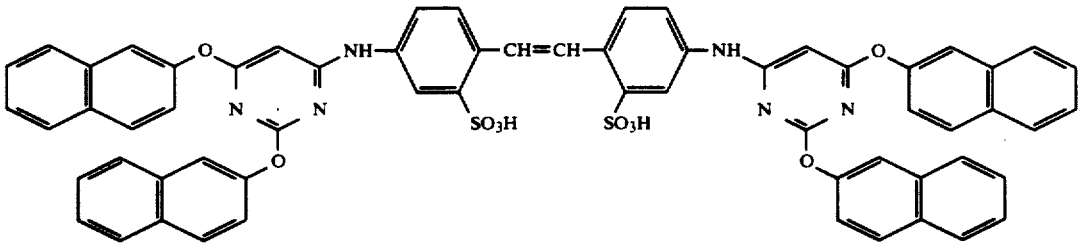

In the blue-sensitive emulsion layer, the green-sensitive emulsion layer and the red-sensitive emulsion layer were further incorporated 1-(5-methylureidophenyl)-5-mercaptotetrazole in amounts of $8.5\times10^{-5}$ mole, $7.7\times10^{-4}$ mole and $2.5\times10^{-4}$ mole, respectively, per mole of silver halide.

Furthermore, 4-hydroxy-6-methyl-1,3,3a,7-tetrazaindene was added to the blue-sensitive emulsion layer and the green-sensitive emulsion layer in amounts of $1.2\times10^{-2}$ mole and $1.1\times10^{-2}$ mole, respectively, per mole of silver halide.

The following dyes were added to the emulsion layers for prevention of irradiation:

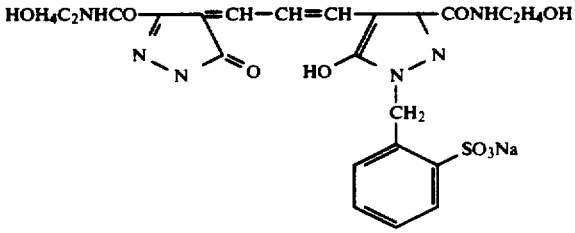

and

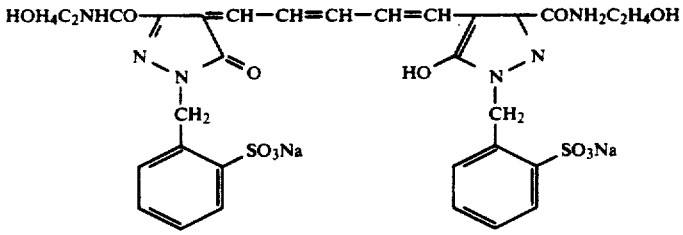

TABLE D

| Layer | Main Ingredients | Amount used |
|---|---|---|
| 7th Layer | Gelatin | 1.33 g/m$^2$ |
| Protective | Acryl-denatured polyvinyl | 0.17 g/m$^2$ |
| layer) | alcohol (denaturing degree 17%) | |
| | Liquid paraffin | 0.03 g/m$^2$ |
| 6th Layer | Gelatin | 0.53 g/m$^2$ |
| (Ultravio- | Ultraviolet absorbent (i) | 0.21 g/m$^2$ |
| let absorb- | Solvent (k) | 0.08 g/m$^2$ |
| ing layer) | | |
| 5th Layer | Silver halide emulsion | Silver: 0.23 g/m$^2$ |
| (Red sensi- | Gelatin | 1.34 g/m$^2$ |
| tive emul- | Cyan coupler (l) | 0.34 g/m$^2$ |
| sion layer) | Color image stabilizer (m) | 0.17 g/m$^2$ |
| | Polymer (n) | 0.40 g/m$^2$ |
| | Solvent (o) | 0.23 g/m$^2$ |
| 4th Layer | Gelatin | 1.58 g/m$^2$ |
| (Ultravio- | Ultraviolet absorbent (l) | 0.62 g/m$^2$ |
| let absorb- | Color stain inhibitor (j) | 0.05 g/m$^2$ |
| ing layer) | Solvent (k) | 0.24 g/m$^2$ |
| 3rd Layer | Silver halide emulsion | silver: 0.16 g/m$^2$ |
| (Green-sen- | Gelatin | 1.79 g/m$^2$ |
| sitive emul- | Magenta coupler (e) | 0.32 g/m$^2$ |
| sion layer) | Color image stabilizer (f) | 0.20 g/m$^2$ |
| | Color image stabilizer (g) | 0.01 g/m$^2$ |
| | Solvent (h) | 0.65 g/m$^2$ |
| | Additive (v) | 0.023 g/m$^2$ |
| | Additive (w) | 0.036 g/m$^2$ |
| 2nd Layer | Gelatin | 0.99 g/m$^2$ |

TABLE D-continued

| | | | |
|---|---|---|---|
| (Color stain inhibiting layer) | Color stain inhibitor (d) | | 0.08 g/m$^2$ |
| 1st layer (Blue sensitive emulsion layer) | Silver halide emulsions | silver: | 0.26 g/m$^2$ |
| | Gelatin | | 1.83 g/m$^2$ |
| | Yellow coupler (a) | | 0.83 g/m$^2$ |
| | Color image stabilizer (b) | | 0.19 g/m$^2$ |
| | Solvent (c) | | 0.35 g/m$^2$ |
| Support | Polyethylene-laminated paper (containing white pigment ($TiO_2$) and bluish pigment (ultramarine) in polyethylene laminate on the 1st layer side) | | |

(a) Yellow Coupler

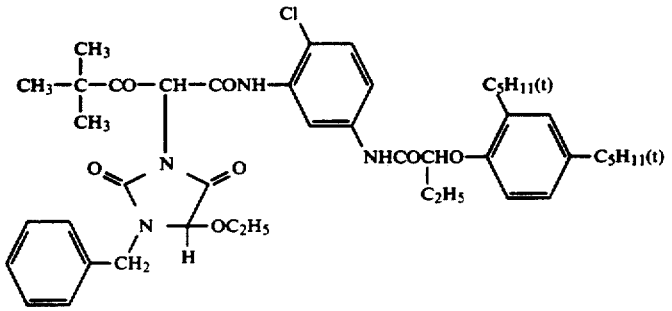

(b) Color Image Stabilizer

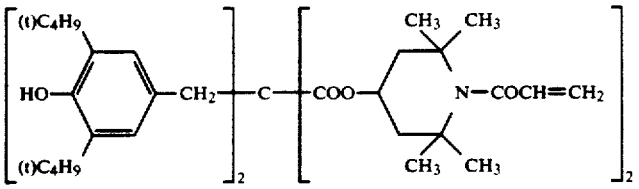

(c) Solvent

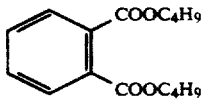

(d) Color Stain Inhibitor

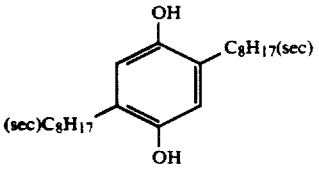

(e) Magenta Coupler

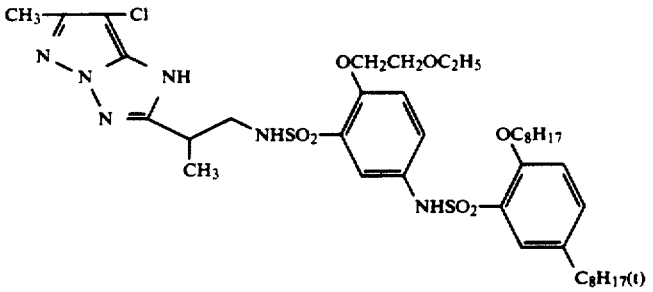

(f) Color Image Stabilizer

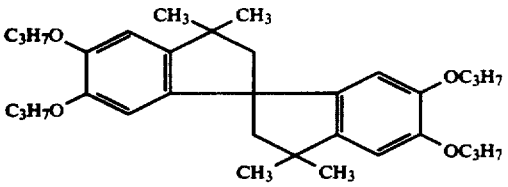

(g) Color Image Stabilizer

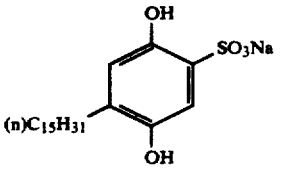

(h) Solvent

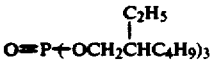

and (i) Ultraviolet Absorbent

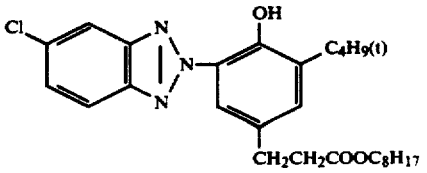

TABLE D-continued

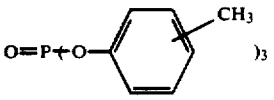

2:1 Mixture (by volume)

(j) Color Stain Inhibitor

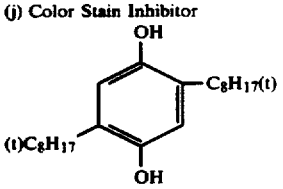

(l) Cyan Coupler
See Table 5
(m) Color Image Stabilizer
5:8:9 Mixture (by weight) of

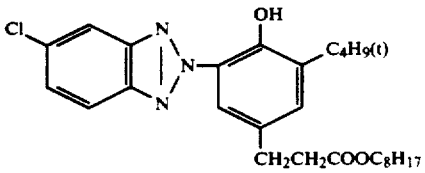

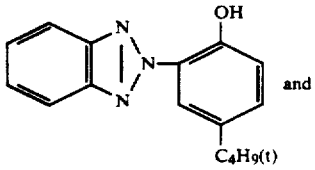

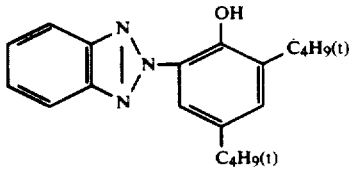

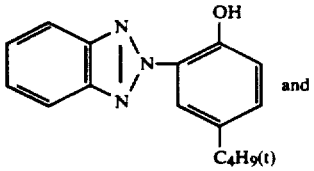

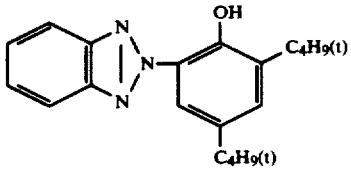

2:9:8 Mixture (by weight)

(k) Solvent
$O{=}P{\leftarrow}O{-}C_9H_{19}(iso))_3$
(n) Polymer $$\leftarrow CH_2{-}\underset{\underset{CONHC_4H_9(t)}{|}}{CH}\rightarrow_n$$

mean molecular weight: 35,000

(o) Solvent

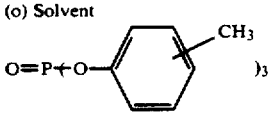

(v) Additive

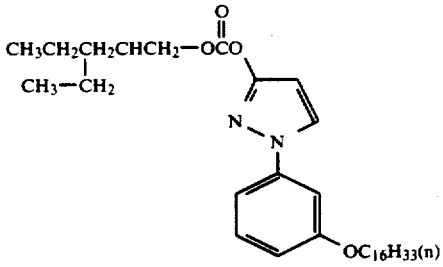

(w) Additive

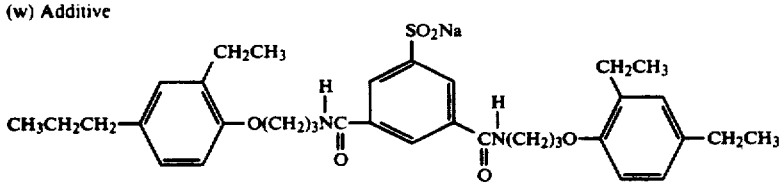

The color photographic paper obtained was processed in the same manner as in Example 5. The results obtained are shown in Table 5.

TABLE 5

| Experiment No. | Cyan Coupler* | Sodium Sulfite (g/l) | Additive C 0.04 mol/l | Additive D 0.03 mol/l | Developer | Changes in Photographic Properties: Dmin | Gradation |
|---|---|---|---|---|---|---|---|
| 1 | C-9 | 1.8 | II-14 | Triethanolamine | Comparison | +0.08 | +0.20 |
| 2 | C-1 | 1.8 | " | " | " | +0.08 | +0.20 |
| 3 | C-1 | 0 | " | " | " | +0.06 | +0.15 |
| 4 | (A) | 1.8 | " | I-1 | Invention | +0.03 | +0.08 |
| 5 | (B) | 1.8 | " | " | " | +0.03 | +0.07 |
| 6 | C-9 | 1.8 | " | " | " | +0.01 | +0.06 |

TABLE 5-continued

| Experiment No. | Cyan Coupler* | Sodium Sulfite (g/l) | Additive C 0.04 mol/l | Additive D 0.03 mol/l | Developer | Changes in Photographic Properties Dmin | Gradation |
|---|---|---|---|---|---|---|---|
| 7 | C-1 | 1.8 | " | " | " | +0.01 | +0.06 |
| 8 | (A) | 0 | " | " | " | +0.03 | +0.06 |
| 9 | (B) | 0 | " | " | " | +0.03 | +0.05 |
| 10 | C-9 | 0 | " | " | " | 0 | +0.01 |
| 11 | C-1 | 0 | " | " | " | 0 | +0.01 |
| 12 | (A) | 0 | II-13 | " | " | +0.03 | +0.05 |
| 13 | (B) | 0 | " | " | " | +0.03 | +0.06 |
| 14 | C-9 | 0 | " | " | " | +0.01 | +0.01 |
| 15 | C-1 | 0 | " | " | " | 0 | 0 |
| 16 | (A) | 0 | II-14 | I-2 | " | +0.04 | +0.04 |
| 17 | C-9 | 0 | " | " | " | +0.01 | +0.01 |
| 18 | C-3 | 0 | " | " | " | +0.01 | +0.01 |

*(A) and (B) are the same as those used in Example 1.

As can be seen from the data in Table 5, reduced changes in Dmin and gradation were achieved in the embodiments of the present invention.

In particular, more desirable results were obtained when the color developer contained sodium sulfite in a low concentration, and the compound of formula (C-I) was employed as a cyan coupler.

EXAMPLE 7

A color photographic paper was prepared in the same manner as in Example 6, (except only the compound represented by formula (C-1) was used as a cyan coupler).

After imagewise exposure, the color photographic paper was subjected to the following processing steps using a Fuji Color Paper Processer PP-600, wherein various kinds of color developers underwent a running process test in which the process was continued until the amount of replenisher became equal to two times the volume of the color development tank.

| Processing Step | Temperature | Time | Amount supplemented* | Volume of Tank |
|---|---|---|---|---|
| Color Development | 38° C. | 100 sec. | 290 ml | 171 |
| Bleach-Fix | 33° C. | 60 sec. | 150 ml | 91 |
| Rinsing 1 | 30-34° C. | 20 sec. | — | 41 |
| Rinsing 2 | 30-34° C. | 20 sec. | — | 41 |
| Rinsing 3 | 30-34° C. | 20 sec. | 364 ml | 41 |
| Drying | 70-80° C. | 50 sec. | | |

*per 1 $m^2$ of the color paper.

The rinsing step was carried out according to the three-stage counter current process, in which the rinsing solution flowed from Rinsing Tank 3 to rinsing Tank 1.

Processing solutions employed in the foregoing steps, respectively, are described below.

| | Tank Solution | Replenisher |
|---|---|---|
| **Color Developer** | | |
| Water | 800 ml | 800 ml |
| Compound of the Invention | | See Table 6 |
| Ethylenediamine-N,N,N'N'-tetramethylenephosphonic Acid | 3.0 g | 3.0 g |
| Brightening Agent (UVITEX CK, produced by Ciba Geigy Ltd.) | 2.5 g | 4.0 g |
| Sodium Sulfite | 0.1 g | 0.2 g |
| Potassium Bromide | 0.5 g | — |
| Potassium Carbonate | 30 g | 30 g |
| N-ethyl-N-(β-methanesulfonamidoethyl)-3-methyl-4-aminoaniline Sulfate | 5.5 g | 7.5 g |
| N,N-diethylhydroxyamine Sulfate | 2.0 g | 2.5 g |
| Water to make | 1,000 ml | 1,000 ml |
| pH (at 25° C.) adjusted to | 10.20 | 10.60 |
| **Bleach-Fix Bath** | | |
| Water | 400 ml | 100 ml |
| Ammonium Thiosulfate (70%) | 200 ml | 300 ml |
| Sodium Sulfite | 20 g | 40 g |
| Ammonium Ethylenediamine-tetraacetatoferrate (III) | 60 g | 120 g |
| Disodium Ethylenediamine-tetraacetate | 5 g | 10 g |
| Water to make | 1,000 ml | 1,000 ml |
| pH (at 25° C.) adjusted to | 6.70 | 6.30 |

Rinsing Solution

Ion exchange water (in which the calcium and magnesium concentrations were below 3 ppm).

Changes in photographic characteristics (Dmin and gradation) between the start and the finish of the running process for each processing formula is shown in Table 6.

In accordance with the present invention, changes in photographic characteristics resulting from the running process were remarkably reduced.

TABLE 6

| Experiment No. | Additive 0.04 mol/l | | Changes in Dmin B | G | R | Changes in Gradation B | G | R |
|---|---|---|---|---|---|---|---|---|
| 1 | — | Comparison | +0.08 | +0.03 | +0.02 | +0.09 | +0.09 | +0.10 |
| 2 | Triethanolamine | " | +0.05 | +0.03 | +0.01 | +0.07 | +0.07 | +0.06 |
| 3 | Sodium Sulfite | " | +0.02 | +0.01 | 0 | +0.14 | +0.13 | +0.20 |
| 4 | Poly(ethyleneimine) | " | +0.06 | +0.02 | +0.01 | +0.08 | +0.08 | +0.10 |
| 5 | I-(1) | Invention | +0.01 | 0 | 0 | +0.01 | +0.02 | 0 |
| 6 | I-(2) | " | +0.02 | 0 | 0 | +0.02 | 0 | 0 |
| 7 | I-(8) | " | +0.01 | 0 | 0 | +0.01 | +0.01 | |
| 8 | I-(13) | " | +0.02 | 0 | 0 | +0.02 | +0.01 | +0.02 |

TABLE 6-continued

| Experiment No. | Additive 0.04 mol/l | | Changes in Dmin B | G | R | Changes in Gradation B | G | R |
|---|---|---|---|---|---|---|---|---|
| 9 | I-(14) | " | +0.02 | 0 | 0 | +0.01 | +0.01 | +0.02 |
| 10 | I-(16) | " | +0.01 | 0 | 0 | +0.01 | 0 | +0.02 |

EXAMPLE 8

The following color photographic paper was prepared. The procedures of Nos. 1 to 18 in Example 2 were applied to the color photographic paper thus obtained instead of the color photographic paper used in Example 2.

An integral multilayer color paper was prepared by coating layers so as to have the layer structure described below on a paper support laminated with polyethylene on both sides thereof. The coating liquid was prepared by mixing to dissolve an emulsion, additives and emulsified dispersion of couplers, according to the following manner.

Preparation of Coupler Emulsion;

To 19.1 g of the yellow coupler(ExY) and 4.4 g of the color image stabilizer (Cpd-1) were added 27.2 ml of ethyl acetate and 7.7 ml of the solvent (Solv.-1) to prepare a solution. The solution was dispersed, in an emulsified condition, into 185 ml of a 10% aqueous gelating solution containing 8 ml of a 10% solution of sodium dodecylbenzenesulfonate. In the same way, emulsions for magenta layer, cyan layer and an intermediate layer were prepared. Compounds used in the respective emulsion layers are as follows:

(ExY) Yellow Coupler

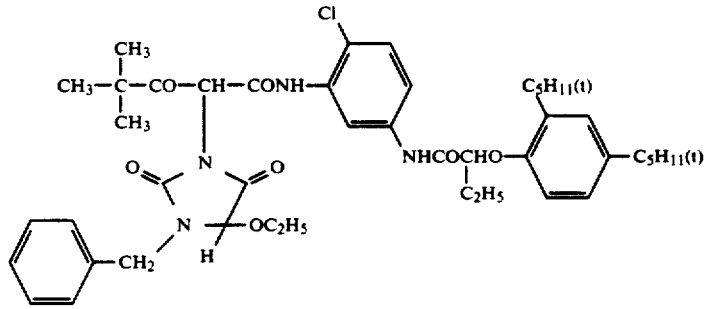

(ExM1) Magenta Coupler

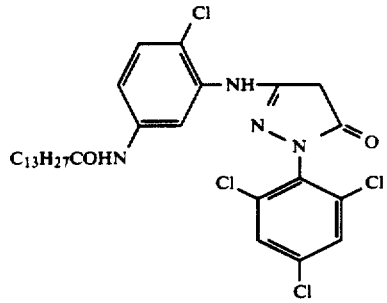

(ExC1)

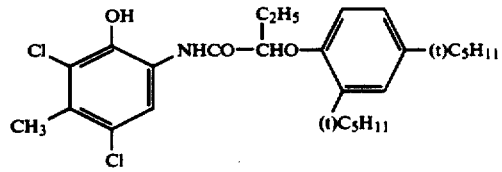

(ExC2)

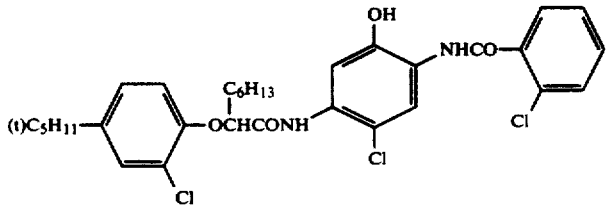

-continued
(ExC4)
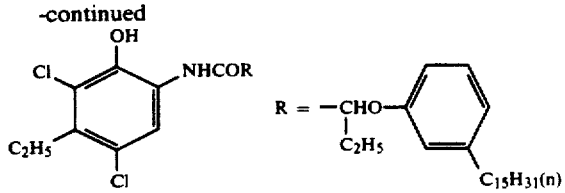
(ExC5)
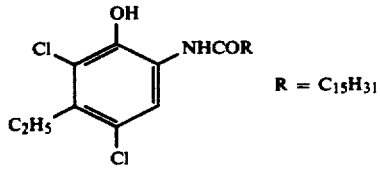
(Cpd-1) Color Image Stabilizer
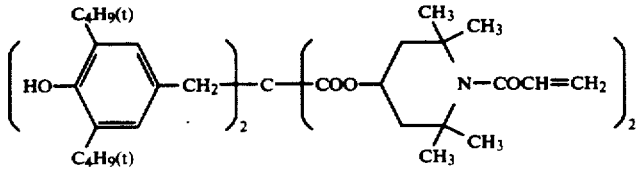
(Cpd-2) Color Mixing Preventing Agent
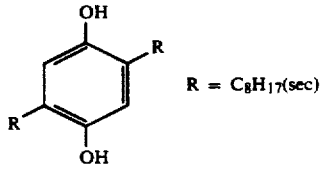
(Cpd-3)
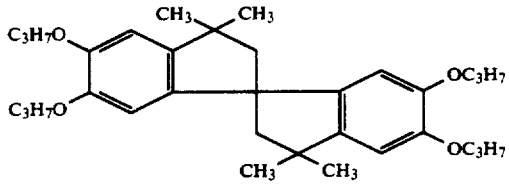
(Cpd-4)
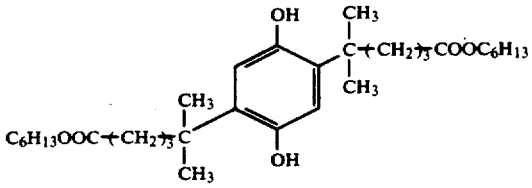
(Cpd-5) Color Mixing Preventing Agent
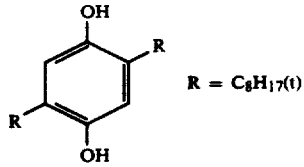
(Cpd-6) Color Image Stabilizer
(Mixture of 6a, 6b and 6c compounds; 6a:6b:6c = 5:8:9 by weight)
6a
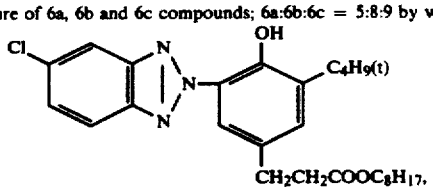
6b
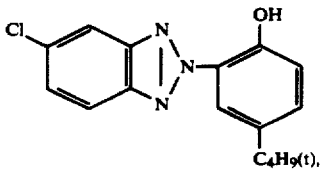

-continued

6c

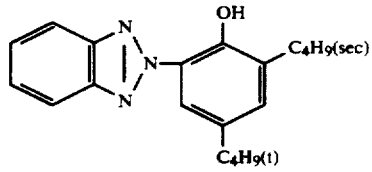

(Cpd-7) Polymer

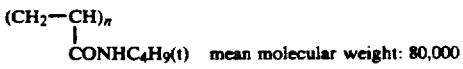

mean molecular weight: 80,000

(UV-1) Ultraviolet Absorbance

Mixture of Cpd-6a, Cpd-6b and Cpd-6c (2:9:8 by weight)

(Solv-1) Solvent

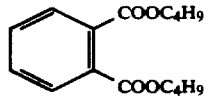

(Solv-2) Solvent $O{=}P{+}O—C_8H_{17}(iso))_3$ (Solv-3) Solvent $O{=}P{+}O—C_9H_{19}(iso))_3$ (Solv-4) Solvent

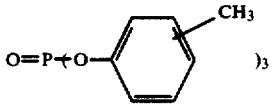

The following dyes were added to the emulsion layers for prevention of irradiation.

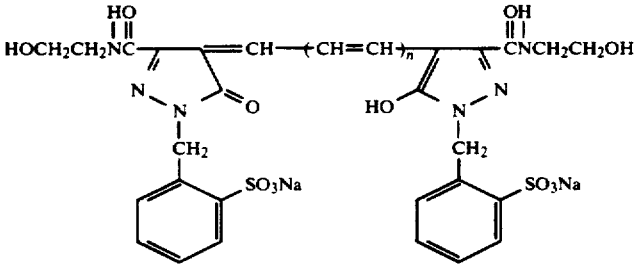

Dye-R wherein n is an integer of 2

Green sensitive layer

Dye-R (which is the same dye as above except for n being an integer of 1)

In the red-sensitive emulsion layer, the following compound was incorporated in an amount $2.6\times10^{-3}$ mole per mole of silver halide.

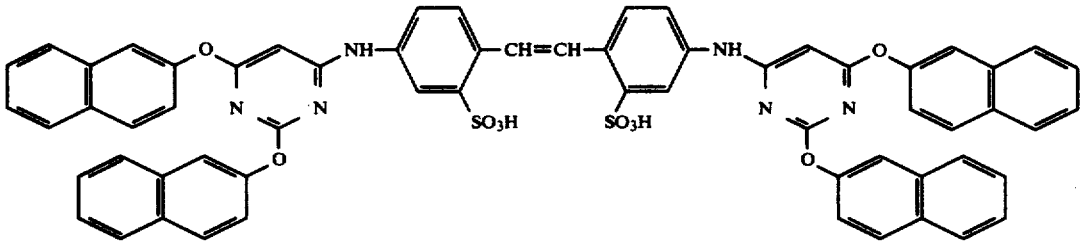

The emulsions used in the Example were prepared in the following manner.

Blue Sensitive emulsion

By following the conventional procedure, monodispersed cubic silver chloride emulsion having 1.1 μm of average particle size, 0.10 of variation coefficient which is designated as a value of s/d (standard deviation is divided by average particle size) and containing $K_2IrCl_6$ and 1,3-dimethylimidazaoline-2-thion was prepared. To 1.0 kg of emulsion thus obtained were added 26 ml of 0.6% solution containing blue spectral sensitizing dye (s-1) and an emulsion containing silver bromide fine particles having average diameter of 0.05 μm in an amount of 0.5 mol % based on the host silver chloride emulsion. After ripening, sodium thiosulfate was added to the emulsion thus obtained to perform an appropriate chemical sensitization. Then, stabilizer(Stb-1) was added in an amount of $10^{-4}$ mol per mol of Ag to prepare a blue sensitive emulsion.

Green Sensitive Emulsion

By following the conventional procedure, silver chloride particles containing $K_2IrCl_6$ and 1,3-dimethylimidazoline-2-thion were prepared. The sensitizing dye (s-2) in an amount of of $4\times10^{-4}$ mol per mol of Ag and KBr were added to the emulsion thus obtained, After ripening, sodium thiosulfate was added to the emulsion to perform an appropriate chemical sensitization, and subsequently, stabilizer (Stb-1) was added in an amount of $5\times10^{-4}$ mol per mol of Ag to prepare mono-disperse cubic silver chloride emulsion having 0.48 μm of average particle diameter and 0.10 of variation coefficient.

Red Sensitive Emulsion

A Red sensitive emulsion was prepared in the same manner as a preparation of a green sensitive emulsion except for using a sensitizing dye (s-3) in an amount of $1.5\times10^{-4}$ mol per mol of Ag instead of the sensitizing dye (s-2).

Compounds used in the Example are as follows.

(S-1) Sensitizing Dye

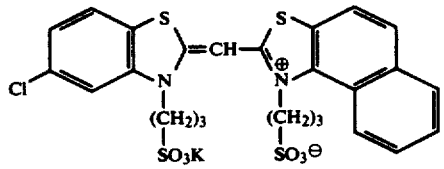

(S-2) Sensitizing Dye

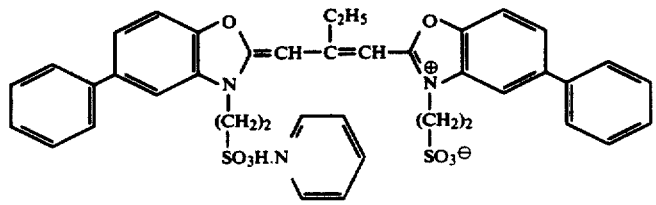

(S-3) Sensitizing Dye

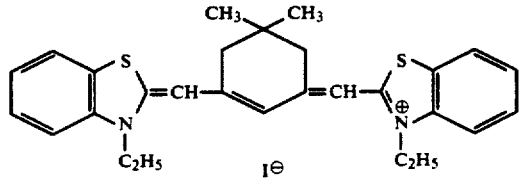

(stb-1) Stabilizer

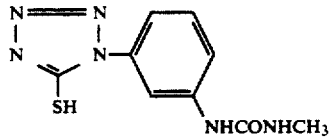

Layer Structure

Coating compositions for each layer are as follows.

| Layer | Main Ingredients | Amount used |
|---|---|---|
| 7th Layer (Protective layer) | Gelatin | 1.33 g/m$^2$ |
| | Acryl-denatured polyvinyl alcohol (denaturing degree 17%) | 0.17 g/m$^2$ |
| | Liquid paraffin | 0.03 g/m$^2$ |
| 6th Layer (Ultraviolet absorbing layer) | Gelatin | 0.53 g/m$^2$ |
| | Ultraviolet absorbent (UV-1) | 0.21 g/m$^2$ |
| | Solvent (Solv-3) | 0.08 g/m$^2$ |
| 5th Layer (Red sensitive emulsion layer) | Silver halide emulsion | silver: 0.23 g/m$^2$ |
| | Gelatin | 1.34 g/m$^2$ |
| | Cyan coupler (1:1 mixture of Ex C1 and C2) | 0.34 g/m$^2$ |
| | Color image stabilizer (Cpd-6) | 0.17 g/m$^2$ |
| | Polymer (Cpd-7) | 0.40 g/m$^2$ |
| | Solvent (Solv-4) | 0.23 g/m$^2$ |
| 4th Layer (Ultraviolet absorbing layer) | Gelatin | 1.58 g/m$^2$ |
| | Ultraviolet absorbent (UV-1) | 0.62 g/m$^2$ |
| | Color stain inhibitor (Cpd-5) | 0.05 g/m$^2$ |
| | Solvent (Solv-3) | 0.24 g/m$^2$ |
| 3rd Layer (Green sensitive emulsion layer) | Silver halide emulsion | silver: 0.36 g/m$^2$ |
| | Silver: | |
| | Gelatin | 1.24 g/m$^2$ |
| | Magenta coupler (Ex. M1) | 0.31 g/m$^2$ |
| | Color image stabilizer (Cpd-3) | 0.25 g/m$^2$ |
| | Color image stabilizer (Cpd-4) | 0.12 g/m$^2$ |
| | Solvent (Solv-2) | 0.42 g/m$^2$ |
| 2nd Layer (Color stain inhibiting layer) | Gelatin | 0.99 g/m$^2$ |
| | Color mixing inhibitor (Cpd-2) | 0.08 g/m$^2$ |

-continued

| Layer | Main Ingredients | Amount used |
|---|---|---|
| 1st Layer (Blue sensitive emulsion layer) | Silver halide emulsion | silver: 0.30 g/m$^2$ |
| | Gelatin | 1.86 g/m$^2$ |
| | Yellow coupler (Ex. Y) | 0.82 g/m$^2$ |
| | Color image stabilizer (Cpd-1) | 0.19 g/m$^2$ |
| | Solvent (Solv-1) | 0.35 g/m$^2$ |
| Support | Polyethylene-laminated paper (containing white pigment ($TiO_2$) and bluish pigment (ultramarine) in polyethylene laminate on the 1st layer side) | |

As a hardening agent, 1-oxy-3,5-dichloro-s-triazine sodium salt was used.

Photographic properties of the color photographic paper which were applied by the procesure Nos. 5 to 18 were hardly varied to be sufficient enough to exert superior effects.

In accordance with the embodiments of the present invention, the stability and the color developability of color developers were remarkably enhanced. Therefore, an increase in fog and a change in gradation were considerably suppressed, that is, color images with excellent photographic characteristics were obtained, even when aged color developers were used in photographic development processing.

The above-described effect of the present invention was prominent particularly when color developers not containing a substantial amount of benzyl alcohol were used. This has the advantage of reducing the high pollution load caused by disposal of used developer solution containing benzyl alcohol.

Further, the effect of the present invention was also remarkable when sensitive materials containing cyan couplers represented by formula (C-I)were processed.

Furthermore, the increase in fog was considerably reduced in the running development process and the color images obtained was also excellent in keeping stability.

While the invention has been described in detail and with reference to specific embodiments thereof, it will be apparent to one skilled in the art that various changes and modifications can be made therein without departing from the spirit and the scope thereof.

What is claimed is:

1. A method of processing a silver halide color photographic material, which comprises processing an imagewise exposed photographic material with a color developer containing an aromatic primary amine color developing agent and a compound represented by the formula:

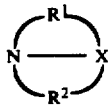

(I)

wherein

X represents a trivalent group necessary to complete a condensed ring;

$R^1$ and $R^2$ each represents an alkylene group, an arylene group, an alkenylene group, or an aralkylene group.

2. A method as in claim 1, wherein said color developer does not contain a substantial amount of benzyl alcohol.

3. A method as in claim 1, wherein X is selected from the group consisting of a nitrogen atom, a hydrogen-substituted carbon atom, an imine group, an alkyl group, a hydroxy-substituted alkyl group, an alkylamine group, a ketone group, an aryl group, and mono- and polycyclic ring systems containing one to three nitrogen atoms as ring members.

4. A method as in claim 1, wherein the compound represented by formula (I) is represented by the formula:

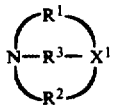

(I-a)

wherein $X^1$ represents

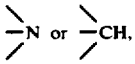

$R^1$ and $R^2$ may be the same or different and each have the same meaning as $R^1$ and $R^2$ in formula (I) set forth in claim 1 above and $R^3$ represents one of the groups represents by $R^1$ and $R^2$, or

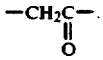

5. A method as in claim 4, wherein $X^1$ represents

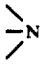

and $R^1$, $R^2$ and $R^3$, respectively, each represents an alkylene group or an arylene group having six or less carbon atoms.

6. A method as in claim 1, wherein the compound represented by formula (I) is represented by the formula:

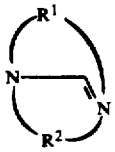

(I-b)

wherein $R^1$ and $R^2$ may be the same or different and each have the same meaning as $R^1$ and $R^2$ in formula (I) set forth in claim 1 above.

7. A method as in claim 6, wherein $R^1$ and $R^2$ each represents an alkylene group or an arylene group having eight or less carbon atoms.

8. A method as in claim 1, wherein the compound represented by formula (I) is present in the color developer in an amount of from 0.1 to 50 grams per liter of color developer and the color developer contains not more than 5 grams of a sulfite salt as a preservative per liter of the color developer.

9. A method as in claim 1, where in the color photographic material contains at least one cyan coupler of the formula:

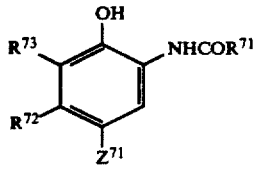

(C-I)

wherein $R^{71}$ represents an alkyl group, a cycloalkyl group, an aryl group, an amino group, or a heterocyclic group;

$R^{72}$ represents an acylamino group or an alkyl group containing 2 or more carbon atoms;

$R^{73}$ represents a hydrogen atom, a halogen atom, an alkyl group, an alkoxy group, or may combine with $R^{72}$ to form a ring;

$Z^{71}$ represents a hydrogen atom, a halogen atom, or a group eliminable in the reaction with the oxidation product of an aromatic primary amine color developing agent.

10. A method as in claim 1, wherein the color developer further contains a preservative which is capable of stabilizing the aromatic primary amine color developing agent selected from the group consisting of a hydroxylamine, a hydroxamic acid, a hydrazine, a hydrazine, a hydrazide, a phenol, an α-hydroxyketone, an α-aminoketone, and a saccharide present in an amount of from 0.01 to 20 grams/liter of color developer.

11. A method as in claim 1, wherein said color developer further contains hydroxylamines represented by the formula:
wherein

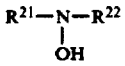

(II)

$R^{21}$ and $R^{22}$ each represents a hydrogen atom, or an unsubstituted or substituted alkyl, alkenyl or aryl group.

12. A method as in claim 11, wherein each $R^{21}$ and $R^{22}$ is selected from the group consisting of an unsubstituted or substituted alkyl group and an unsubstituted or substituted alkenyl group.

13. A method is in claim 1, wherein said color developer further contains a chelating agent.

14. A method as in claim 1, wherein said silver halide color photographic material comprises a reflective support and at least one photosensitive emulsion layer thereon.

15. A method as in claim 1, wherein said silver halide color photographic material comprises a silver halide emulsion layer containing 80 to 100 mol % of silver chloride content.

16. A photographic color developing composition containing an aromatic primary amine color developing agent and a compound represented by the formula:
wherein

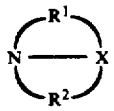

(I)

X represents a trivalent group necessary to complete a condensed ring;

$R^1$ and $R^2$ each represents an alkylene group, an arylene group, an alkenylene group, or an aralkylene group.

17. A photographic color developing composition as in claim 16, wherein the compound represented by formula (I) is represented by the formula:

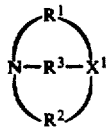

wherein $X^1$ represents

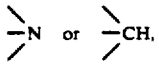

$R^1$ and $R^2$ may be the same or different and each have the same meaning as $R^1$ and $R^2$ in formula(I) set forth in claim 16 above and $R^3$ represents one of the groups represented by $R^1$ and $R^2$, or

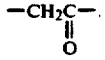

18. A photographic color developing composition as in claim 16, wherein the compound represented by formula (I) is represented by the formula:

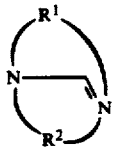

(I-b)

wherein $R^1$ and $R^2$ may be the same or different and each have the same meaning as $R^1$ and $R^2$ in formula (I) set forth in claim 16 above.

19. A photographic color developing composition as in claim 16, wherein the compound represented by formula (I) is present in the color developing composition in an amount of from 0.1 to 50 grams per liter of color developer and the color developer contains not more than 5 grams of a sulfite salt as a preservative per liter of the color developer.

20. A photographic color developing composition as in claim 16, wherein the color developer further contains a preservative which is capable of stabilizing the aromatic primary amine color developing agent selected from the group consisting of a hydroxylamine, a hydroxamic acid, a hydrazine, a hydrazide, a phenol, an α-hydroxyketone, an α-aminoketone, and a saccharide present in an amount of from 0.01 to 20 grams/liter of color developer.

* * * * *